US012151753B2

(12) United States Patent
Yang

(10) Patent No.: US 12,151,753 B2
(45) Date of Patent: *Nov. 26, 2024

(54) USER CONFIGURABLE TRAILER

(71) Applicant: Yang and Cohen Enterprises, Inc., Chandler, AZ (US)

(72) Inventor: Adeel Yang, San Francisco, CA (US)

(73) Assignee: Yang and Cohen Enterprises, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,931

(22) Filed: Aug. 11, 2023

(65) Prior Publication Data

US 2023/0382477 A1 Nov. 30, 2023

Related U.S. Application Data

(63) Continuation of application No. 18/100,075, filed on Jan. 23, 2023, now Pat. No. 11,787,488, which is a
(Continued)

(51) Int. Cl.
*A63B 69/36* (2006.01)
*A63B 47/00* (2006.01)
(Continued)

(52) U.S. Cl.
CPC .......... *B62D 63/061* (2013.01); *A63B 47/002* (2013.01); *A63B 69/3623* (2013.01);
(Continued)

(58) Field of Classification Search
CPC . A63B 47/002; A63B 36/3623; A63B 71/022; A63B 71/0622; A63B 2220/05;
(Continued)

(56) References Cited

U.S. PATENT DOCUMENTS 3,980,304 A 9/1976 O'Neill et al.
5,056,791 A 10/1991 Poillon et al.
(Continued)

FOREIGN PATENT DOCUMENTS

KR 20160103694 A 9/2016

OTHER PUBLICATIONS

We Bring the Golf Course to You | A Look Into Street Swings Trailer Setup. <URL: https://www.youtube.com/watch?v=sza4Olh_jnk> [Published online Nov. 14, 2017].
(Continued)

*Primary Examiner* — Raleigh W Chiu
(74) *Attorney, Agent, or Firm* — Cognition IP, P.C.; Edward Steakley

(57) ABSTRACT

Methods, systems, and apparatus, including computer programs encoded on computer storage media, coordinate dynamic adjustments of a trailer based in part on a user profile associated with a user physically present at the trailer and an activity profile associated with an activity selected to be performed at the trailer. A dynamic adjustment may modify a tilt of a lower surface of the trailer. A dynamic adjustment may modify a dimension(s) of the trailer based in part on a detected object(s). Various dynamic adjustments may occur concurrently, individually and/or sequentially. The trailer may be a moveable trailer for temporary attachment with a vehicle.

28 Claims, 18 Drawing Sheets

System Diagram

Example Trailer

Related U.S. Application Data continuation of application No. 17/396,492, filed on Aug. 6, 2021, now Pat. No. 11,560,193, which is a continuation of application No. 17/172,069, filed on Feb. 9, 2021, now Pat. No. 11,124,253.

(60) Provisional application No. 63/052,860, filed on Jul. 16, 2020.

(51) Int. Cl.

| | |
|---|---|
| *A63B 71/02* | (2006.01) |
| *A63B 71/06* | (2006.01) |
| *B60S 9/04* | (2006.01) |
| *B60W 40/08* | (2012.01) |
| *B60W 50/00* | (2006.01) |
| *B62D 63/06* | (2006.01) |
| *G05B 15/02* | (2006.01) |
| *G06T 7/60* | (2017.01) |
| *H04N 9/31* | (2006.01) |
| *H04N 23/54* | (2023.01) |
| *G06V 20/56* | (2022.01) |

(52) U.S. Cl.
CPC ........ *A63B 71/022* (2013.01); *A63B 71/0622* (2013.01); *B60S 9/04* (2013.01); *B60W 40/08* (2013.01); *B60W 50/0098* (2013.01); *G05B 15/02* (2013.01); *G06T 7/60* (2013.01); *H04N 9/31* (2013.01); *H04N 23/54* (2023.01); *A63B 2220/05* (2013.01); *A63B 2220/806* (2013.01); *A63B 2225/096* (2013.01); *B60W 2040/0809* (2013.01); *B60W 2420/403* (2013.01); *G06T 2207/30196* (2013.01); *G06T 2207/30252* (2013.01); *G06V 20/56* (2022.01)

(58) Field of Classification Search
CPC ........ A63B 2220/806; A63B 2225/096; B62D 63/061; H04N 5/2253; H04N 9/31; H04N 23/54; B60S 9/04; B60W 40/08; B60W 50/0098; B60W 2040/0809; B60W 2420/42; G05B 15/02; G06T 7/60; G06T 2207/30196; G06T 2207/30252; G06V 20/56

See application file for complete search history.

(56) References Cited

U.S. PATENT DOCUMENTS

| | | |
|---|---|---|
| 5,248,180 A | 9/1993 | Hussaini |
| 6,308,160 B1* | 10/2001 | Rex .................. G06Q 10/02 705/5 |
| 6,368,034 B1* | 4/2002 | Frye .................. B60P 3/08 410/24 |
| 6,885,998 B1* | 4/2005 | Arduino .............. G06Q 10/02 705/26.81 |
| 8,820,313 B1 | 9/2014 | Lutes |
| 11,124,253 B1 | 9/2021 | Yang et al. |
| 11,560,193 B2 | 1/2023 | Yang et al. |
| 11,787,488 B2* | 10/2023 | Yang .................. A63B 47/025 296/26.13 |
| 2002/0074816 A1 | 6/2002 | McManus et al. |
| 2007/0038727 A1* | 2/2007 | Bailey .............. G06Q 30/0603 709/219 |
| 2008/0261189 A1* | 10/2008 | Katayama .......... A63B 24/0003 434/257 |
| 2011/0070961 A1 | 3/2011 | Nicora |
| 2012/0270670 A1 | 10/2012 | Kunkle |
| 2014/0001786 A1 | 1/2014 | Cantin et al. |
| 2014/0277627 A1* | 9/2014 | Bastawros ............ H04N 23/69 700/91 |
| 2015/0224909 A1 | 8/2015 | Cepynsky |
| 2016/0347230 A1 | 12/2016 | Pellicer |
| 2019/0166427 A1 | 5/2019 | Mathiasen et al. |
| 2020/0017014 A1 | 1/2020 | Lopez |
| 2020/0250628 A1* | 8/2020 | New .................. G06Q 10/1095 |
| 2020/0317143 A1 | 10/2020 | Goode |

OTHER PUBLICATIONS

Topgolf—HMS Worldwide. <URL: https://hmsworldwide.com/clients/topgolf/>.

Extended European Search Report received in European application No. 21841701.2, mailed on Jul. 5, 2024.

\* cited by examiner

Computer Diagram

Example Trailer

Example Trailer

USER CONFIGURABLE TRAILER

CROSS-REFERENCE TO RELATED APPLICATIONS

This application is a continuation of U.S. application Ser. No. 18/100,075, filed Jan. 23, 2023, which is a continuation of U.S. Non-Provisional application Ser. No. 17/396,492, filed Aug. 6, 2021, which is a continuation of U.S. application Ser. No. 17/172,069, filed Feb. 9, 2021, which claims the benefit of U.S. Provisional Application 63/052,860, filed Jul. 16, 2020, which are hereby incorporated by reference in their entirety.

This application is related to U.S. application Ser. No. 17/172,071, filed Feb. 9, 2021, which is hereby incorporated by reference in its entirety.

BACKGROUND

Conventional trailers allow for customization in that owners can build out the trailer's internal cabin to their specifications. Customized cabins allow for owners to tailor their trailer for their personal interests, from customized comfort for the travel of long distance, equipment for a portable business to equipment for a personal hobby. Such conventional customization are fixed and the activity within the trailer is constrained according to the customization already in place and the decisions of the owner.

SUMMARY

Described herein is an exemplary system and methods of operation for a user configurable trailer. In general, one innovative aspect of the subject described in this specification can be embodied in systems, computer readable media, and methods that coordinate dynamic adjustments of a trailer based in part on a user profile associated with a user physically present at the trailer and an activity profile associated with an activity selected to be performed at the trailer. A dynamic adjustment may be made by the trailer system to modify a tilt of a lower surface of the trailer or reconfigure or move slidable portions or structures of the trailer. A dynamic adjustment may modify a dimension(s) of the trailer based in part on a detected object(s). Various types of dynamic adjustments may occur concurrently, individually and/or sequentially. The trailer may be a moveable trailer for temporary attachment with a vehicle.

Various embodiments of the user configurable trailer provide many benefits and advantages over conventional systems. The user configurable trailer may temporarily attach to a vehicle in order to be moved to varying locations. The user configurable trailer may temporarily detached from a vehicle for placement at a particular location. A user may be physically present proximate to or inside the user configurable trailer and may be associated with a user profile. The user may select an activity to be performed by the user proximate to or inside the user configurable trailer. The activity may be associated with an activity profile. For example, an activity may be golf driving practice and/or basketball shooting practice. Various embodiments of the user configurable trailer may include installed equipment for multiple different types of activities such that the installed equipment may be protracted, retracted, deployed and/or positioned according to the preferences of a user, the requirements of a selected activity and/or one or more detected conditions and events.

Various embodiments of the user configurable trailer includes systems, modules and processing units for detecting and predicting conditions and events that trigger dynamic adjustments of the user configurable trailer's dimensions, surfaces, settings, configurations before, during and/or after the user performs the selected activity. Such dynamic adjustments may be made in real-time and may be based in part on the user profile, the activity profile and a current state of the user as to the performance of the selected activity. For example, a current state of the user may be that the user is currently performing a physical motion required by the selected activity and/or that the user completed a scoring event that is required according to a game rule associated with the selected activity. It is understood that the user profile may be part of a user profile table as described herein. It is understood that the activity profile may be part of a trailer configuration table as described herein.

According to various embodiments, a dynamic adjustment may modify an orientation of an upper surface of the trailer and/or one or more dimensions (internal, external) of the trailer. The user profile may include one or more user attributes representative of physical characteristic, trailer configuration preferences, trailer settings preferences and/or data from previous sessions of the user. The activity profile may include one or more activity attributes representative of activity rules, activity duration, activity equipment, and/or trailer and safety requirements. In some embodiments, a user may specific one or more dynamic adjustments by sending an adjustment request from a mobile device to a data processing system associated with the trailer.

Various embodiments may include a computer vision system(s) for capturing images of the user performing the selected activity at the trailer. Various embodiments may include predictive modeling techniques to train a machine learning network to predict a probability of a dynamic adjustment that may be triggered at the trailer while the user performs the selected activity at the trailer.

Various embodiments may include mobile software applications for communication with a database and information processing system associated with the user configurable trailer for the upload and retrieval of information and for scheduling, reserving, performing and coaching regarding one or more activities. Further areas of applicability of the present disclosure will become apparent from the detailed description, the claims and the drawings. The detailed description and specific examples are intended for illustration only and are not intended to limit the scope of the disclosure.

Various embodiments may include a configurable trailer having a trailer body with the trailer body having a first and second moveable slideout. The trailer body is connected to an axle with the axle having a first and second wheel connected to the axles. The trailer body may be supported by a metal frame connected to the body. A towing hitch is connected to the metal frame and/or trailer body. The configurable trailer has at least two leveling jacks coupled to a bottom portion of the trailer body. The first and second moveable slideouts may be positioned in a trailer transit state where the width of the trailer is less than 9 feet wide. The slideouts may be positioned to an in-use state where the width of the trailer is at least 11 feet wide. The trailer body includes an impact screen affixed to the interior of the trailer body. The trailer body includes a striking zone on the floor of the trailer body at a location at least 10 feet from the impact screen. The striking zone is located on an interior floor of the configurable trailer. The configurable trailer may have computer visions system with one or more video cameras positioned in the interior trailer body. For example, a video camera may be positioned at least 3 feet from the striking zone to obtain imagery of a person swing a golf club while standing within the striking zone.

BRIEF DESCRIPTION OF THE DRAWINGS

The present disclosure will become better understood from the detailed description and the drawings, wherein.

DETAILED DESCRIPTION

Figure 1:
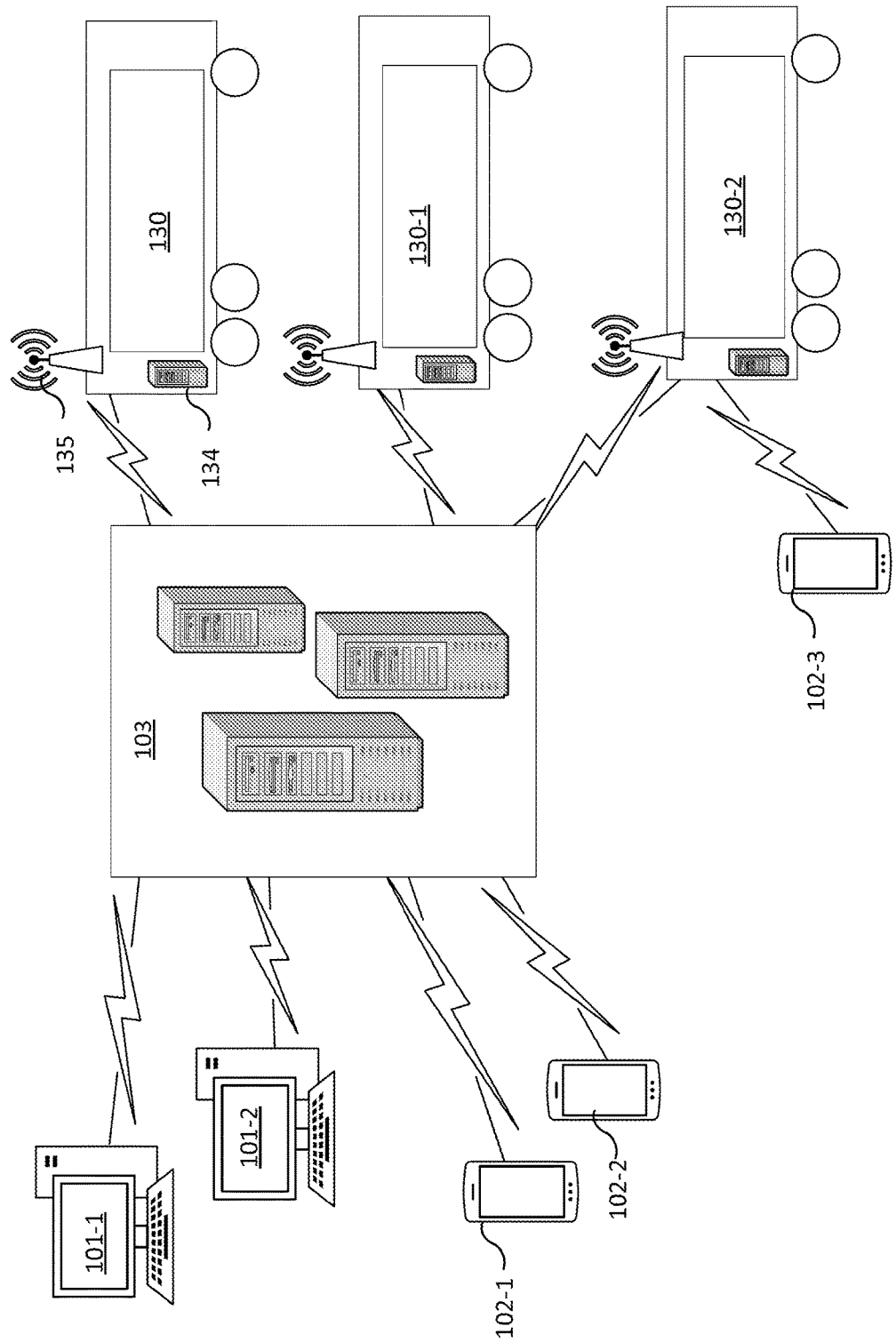
FIG. 1 illustrates a block network diagram of an example system utilized in user configurable trailer.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates a block network diagram of an example system utilized for one or more user configurable trailers. One or more client systems 101-1, 101-2, 102-1, 102-2, 102-3 may communicate with one or more servers 103 (or a cloud-computing environment) over a network to send and receive data from a system 134 associated with one or more configurable trailers 130, 130-1, 130-2.

Figure 2:
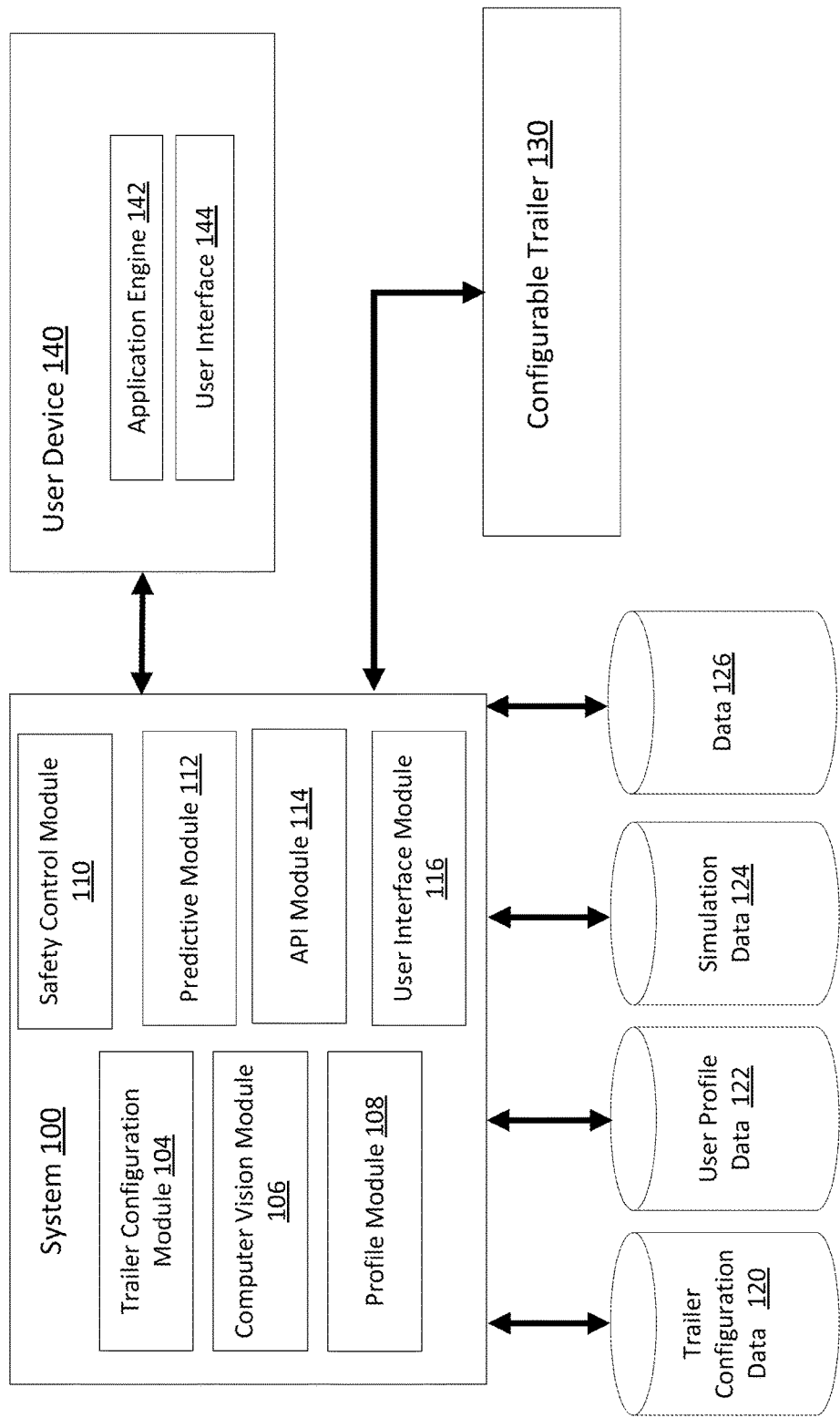
FIG. 2 illustrates a diagram of an example system utilized in user configurable trailer.

FIG. 2 illustrates a block diagram of an example system 100 for dynamically adjusting one or more user configurable trailers 130, 130-1, 130-2. The system 100 may be a distributed system operable in whole or part by system 103, system 134 located in a configurable trailer and/or the devices 101-1, 101-2, 102-1, 102-2, 102-3. The system 100 modules 104, 106, 108, 110, 112, 114, 116 may distributed in whole or part and may be performed by the aforementioned systems and devices. The system 100 includes a trailer configuration module 104, a computer vision module 106, a profile module 108, safety control module 110, a predictive module 112, an API module 114 and a user interface module 116. The predictive module 112 trains a machine learning network with the training data based in part on any portion(s) of trailer configuration data 120, user profile data 122, simulation data 124 and additional system data 126. While the databases 120, 122 124, 126 are displayed separately, the databases and information maintained in a database 120, 122 124, 126 may be combined together or further separated in a manner the promotes retrieval and storage efficiency and/or data security.

The trailer configuration module 104 may perform functionality as described herein. According to various embodiments, the trailer 130 may include one or more sensors, one or more computer processing units and one or more motors for dynamically adjusting any surface(s), any portion(s) and/or any component(s) of the trailer 130. The trailer configuration module 104 may activate the one or more motors to perform the dynamic adjustments by powering the one or more motors according to a particular speed for a given time. It is understood that the dynamic adjustments may correspond to a motor speed and motor operation time calculated by the trailer configuration module 104 in conjunction with the computer processing units. The motor speed and motor operation time may be dependent, in part, on one or more attributes stored in the data 120, 122, 124, 126 and one or more conditions and/or events detected by sensors.

The computer vision module 106 may perform functionality as described herein. The computer vision module 106 obtains and processes digital imagery of a person performing an activity within the trailer 130.

The profile module 108 may perform functionality as described herein. The profile module 108 includes functionality for configuration user and trailer profiles that are used for dynamic configuration of the trailer 130.

The safety control module 110 may perform functionality as described herein. The safety control module 110 includes functionality for perform safety operations when reconfiguring the trailer 130.

The predictive module 112 may perform functionality as described herein. The predictive module 112 includes functionality for performing predicted operations for reconfiguring the trailer 130.

The API module 114 may perform functionality based on an application interface associated with the system 100.

Figure 4:
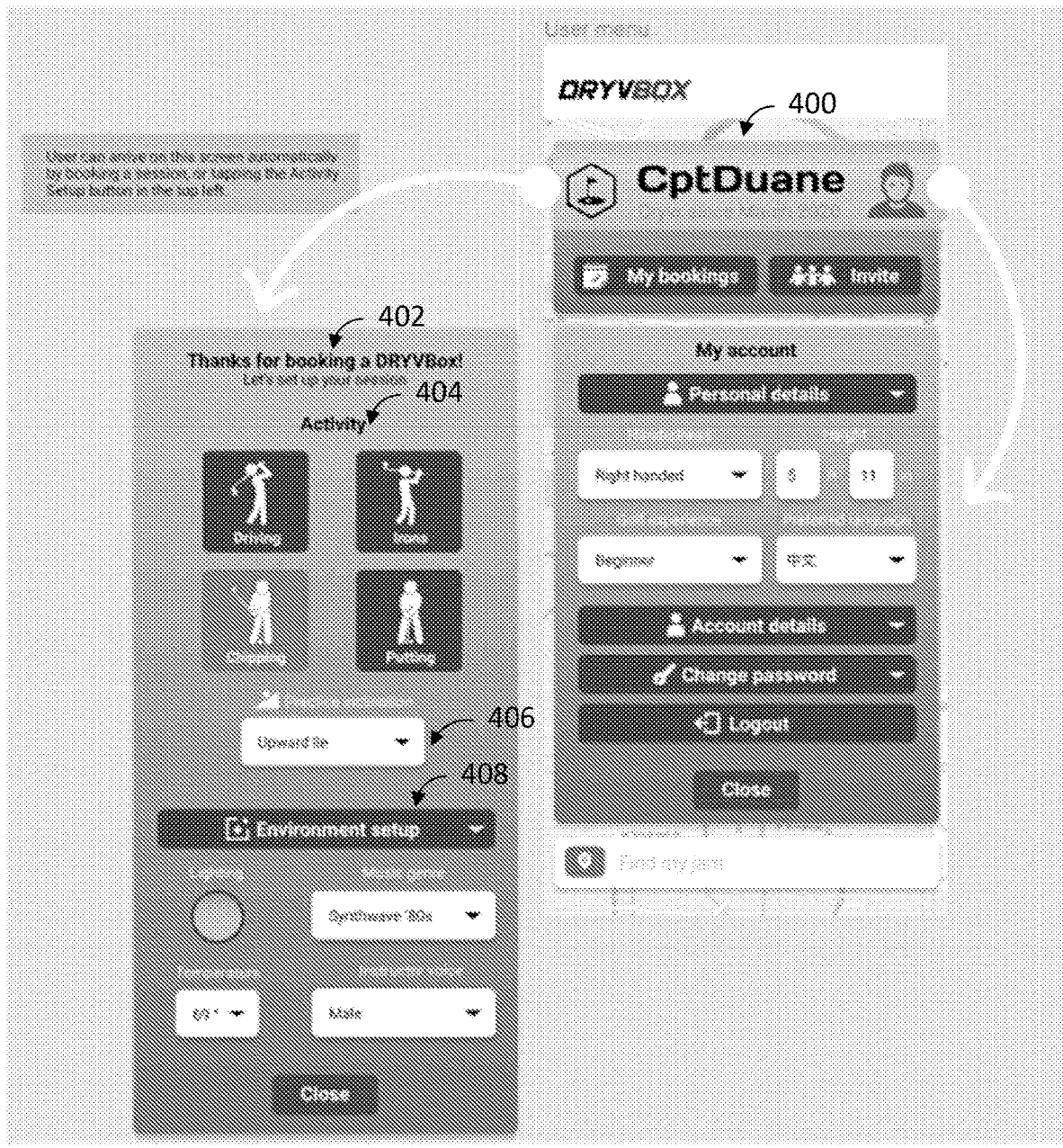
FIG. 4 is a diagram illustrating an exemplary user interface for environment setup and user profile configuration.

The user interface module 116 may perform functionality as illustrated in FIG. 4.

Figure 3:
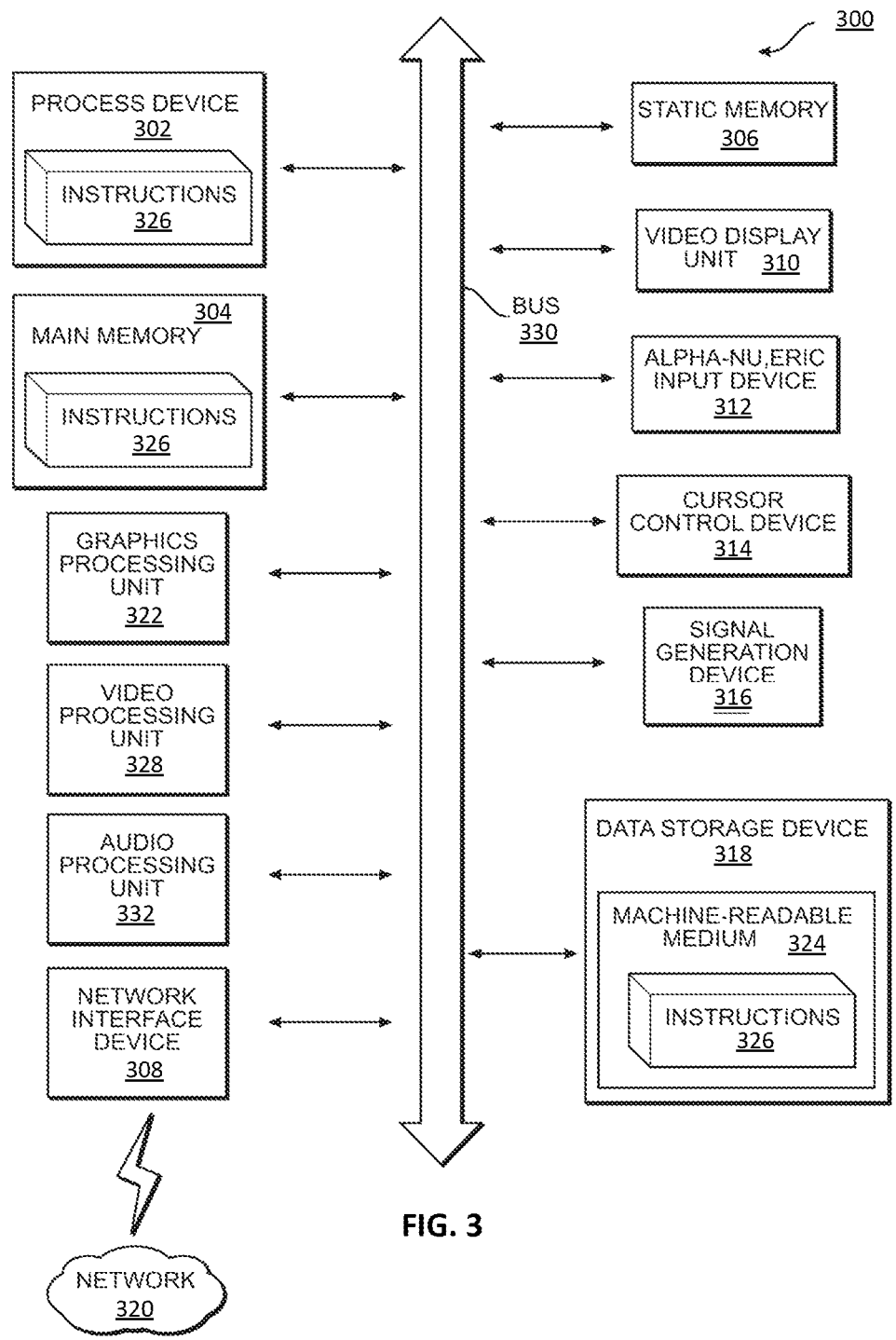
FIG. 3 illustrates a block network diagram of an example system utilized in user configurable trailer.

FIG. 3 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein.

The computer system 300 may further include a network interface device 308 to communicate over the network 320. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), a graphics processing unit 322, a signal generation device 316 (e.g., a speaker), graphics processing unit 322, video processing unit 328, and audio processing unit 332.

The data storage device 318 may include a machine-readable storage medium 324 (also known as a computer-readable medium) on which is stored one or more sets of instructions or software 326 embodying any one or more of the methodologies or functions described herein. The instructions 326 may also reside, completely or at least partially, within the main memory 304 and/or within the processing device 302 during execution thereof by the computer system 300, the main memory 304 and the processing device 302 also constituting machine-readable storage media.

In one implementation, the instructions 326 include instructions to implement functionality corresponding to the components of a device to perform the disclosure herein. While the machine-readable storage medium 324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

FIG. 4 illustrates an example user interface for user trailer configuration. A first and second user interface view 400, 402 may be generated by the user interface module 116. The first user interface view 400 may be based on user account information. A user may access the first user interface view 400 to provide user specific data such as whether the user is right or left-handed, height, experience level and preferred language. The first user interface view 400 may provide a selectable bookings functionality ("My Bookings") to view and reserve activity sessions at the trailer. The second user interface view 402 may be based on one or more types of sessions that may be reserved and have been reserved. The second user interface view 402 may provide a selectable activity functionality ("Activity") 404 at which the user may select what type of activity the user wants to engage in at the trailer. According to a non-limiting example, the activity functionality 404 may provide an activity menu of various types of golf practice sessions from which the user may select. For example, the user may select a chipping activity session during which the user performs various golf chipping drills in the trailer. Each activity listed in the activity menu may be associated with various types of dynamic adjustments for the trailer as well as dynamic adjustments based on the user attributes, activity attributes, safety attributes and/or pre-set attributes.

The second user interface view 402 may provide a selectable incline functionality ("practice inclination") 406 from which the user may select a desired dynamic adjustment(s) of the trailer which results in a particular incline angle for at least a portion of the trailer and/or at least a surface of the trailer. The second user interface view 402 may provide a selectable environment functionality ("Environment setup") 408 at which the user may select desired settings for the trailer, such as desired settings and/or dynamic adjustments to one or more internal portions of the trailer for the selected activity. According to a non-limiting example, the Environment setup functionality 408 may provide an environment menu of various types of trailer configurations and/or options. Such configurations and/or options may include, but are not limited to: a desired type or level of lighting, a desired temperature internal to the trailer, a desired type of music the user wants to hear during a session of the reserved activity and a gender type of a voice of a virtual instructor that will be heard during a session of the reserved activity.

According to various embodiments, the user interface views 400, 402 may be generated by the application engine 142 and presented via the user interface 144 on the user device 140. The user device 140 may be a mobile computer, such as a "smartphone." User inputs and selections may be sent from the application engine 142 to the user interface module 116. The user interface module 116 may initiate one or more operations associated with accessing the data 120, 122, 124 126 and/or identifying one or more portions of the data 120, 122, 124 126 to be processed by the modules 104, 106, 108, 110, 112, 114 as described herein.

The user interface module 116 may generate a user interface allowing a user to enter in a time and date and location of where a trailer is needed. Information input into the user interface of a user device may be received by the system 100 and may be stored in a central service or stored in collection of inter-connected servers. The information may be transmitted from the service or servers directly to an onboard computer system 134 of a trailer 130, 130-1, 130-2 via a cellular or wifi connection 135.

The trailers 130, 130-1, 130-2 may be placed at semi-permanent locations, such as in parking lots, fields, concrete pads and other suitable locations. The trailer's onboard computer system may receive schedules and user activity information from a central computer server(s). As described herein, the information transmitted to the trailer's onboard computer system may include the user profile, activity profiles, and other information that allows the trailer to configure itself to a desired state according to the particular user's characteristics and/or the intended activity to be performed in the trailer. The trailer's onboard computer system may receive an indication that the particular user is in close proximity to the trailer. For example, the user's mobile device may provide location information to the system 100. When the user is within a threshold distance (e.g., with a 1 mile radius of the trailer), the trailer may reconfigure itself from a resting state to a usable state based on the received information. Similarly, the trailer may reconfigure itself from a resting state to a usable state based on a particular date and time of an intended use. This allows the trailer to configure itself before the user arrives.

According to various embodiments, one or more dynamic adjustments may be applied to the trailer 130 at the resting state in order to result in the trailer 130 being configured according to dimensions associated with the first view 930. The system 100 may receive data related to a user profile and/or an activity profile. Theses profiles are akin to a template which informs the system 100 how the trailer should be configured. For example, an activity profile may indicate that the user may want to practice driving balls with a golf club. Based on the activity profile, the system 100 would configure the trailer slideouts and/or other moveable components into positions that are suitable for the user to perform or practice the activity. In this instance, for example, the system 100 may extend the slideouts to the maximum extended width so to allow sufficient clearance for a user to fully swing a golf club.

Figure 5B:
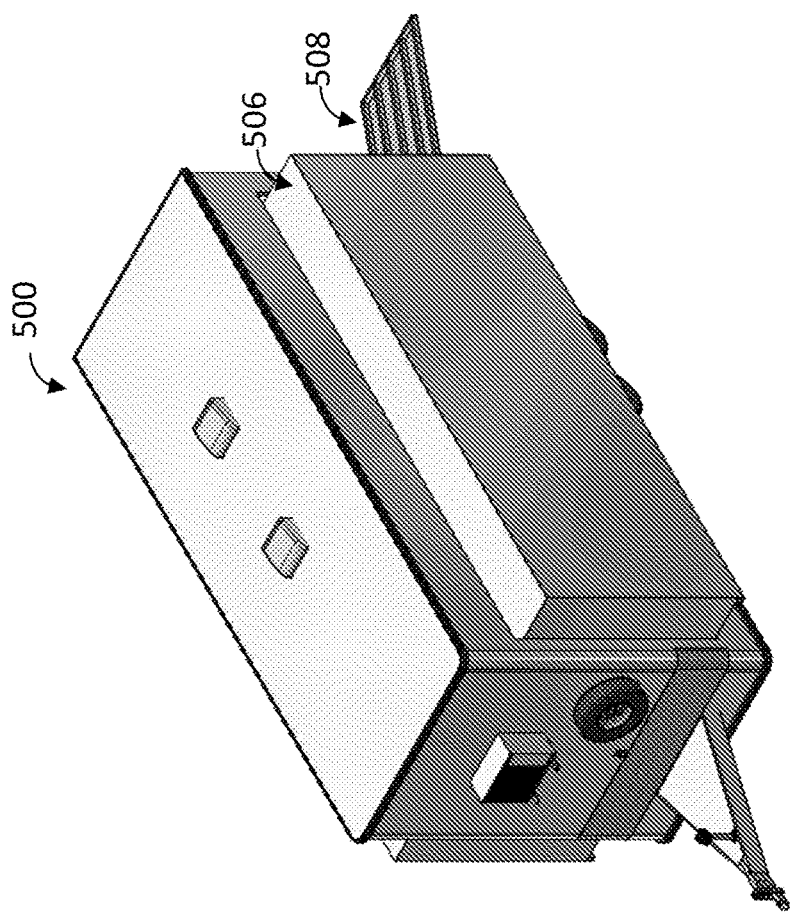
FIGS. 5A-5F are each a diagrams illustrating exemplary configurable trailers.
Figure 5A:
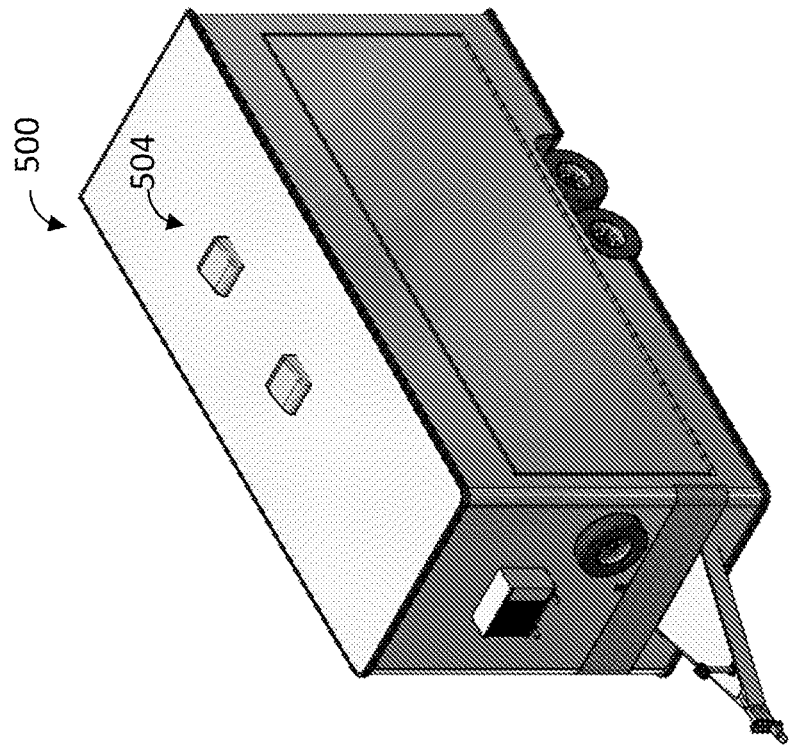

FIGS. 5A and 5B illustrate an example trailer 500 (also referred to as 130 in other figures) for user trailer configuration according to the trailer configuration module 104. The trailer 500 may be configured according to one or more settings, profiles, activities, events and conditions such that an upper surface 504 (such as a roof) may completely cover an internal portion of the trailer 500. In various embodiments, the trailer 500 may dynamically adjust the upper surface 504 so that the upper surface is moved, retracted, tilted and/or lifted. In some embodiments, adjustment of the upper surface 504 results in exposure of at least a portion of the internal portion of the trailer 130. The trailer 500 may include a retractable ramp 508 as well.

The trailer 500 may have one or more slideout components 506 that move horizontally and/or vertically. The trailer 500 may include object detection functionality in the computer vision module 106 that may detect one or more objects external to the trailer 130. Based in part on a proximity of any detected external object, the trailer 500 may dynamically adjust a position of one or more of the slideout components 506 in order to increase or decrease a horizontal/vertical dimension of the trailer 500 without coming into contact with the detected external object. In various embodiments, the dynamic adjustments of the slideout components 506 may further be performed in real-time according to a current state of a user physically present at the trailer 500. For example, a first slideout component may be adjusted such that the trailer 500 moves the first slideout component ten feet from its current position while a second slideout component may be adjusted such that the trailer 500 moves the second slideout component five feet from its current position.

According to various embodiments, a dynamic adjustment of a slideout position may be the result of running one or more motors associated with a respective slideout 506 for a period of time and/or at a certain speed that corresponds, in part, to one or more attributes as described herein. While a slideout position is being dynamically adjusted such that it is being moved from a current orientation to a new orientation, a sensor of the trailer 500 may detect that further movement of the slideout may result in the slideout coming into contact with an external object. Based on the detection by the sensor, the trailer configuration module 104 may send a message to the one or more motors to halt operation and to cease dynamically adjusting the position of the respective slideout.

Figure 5D:
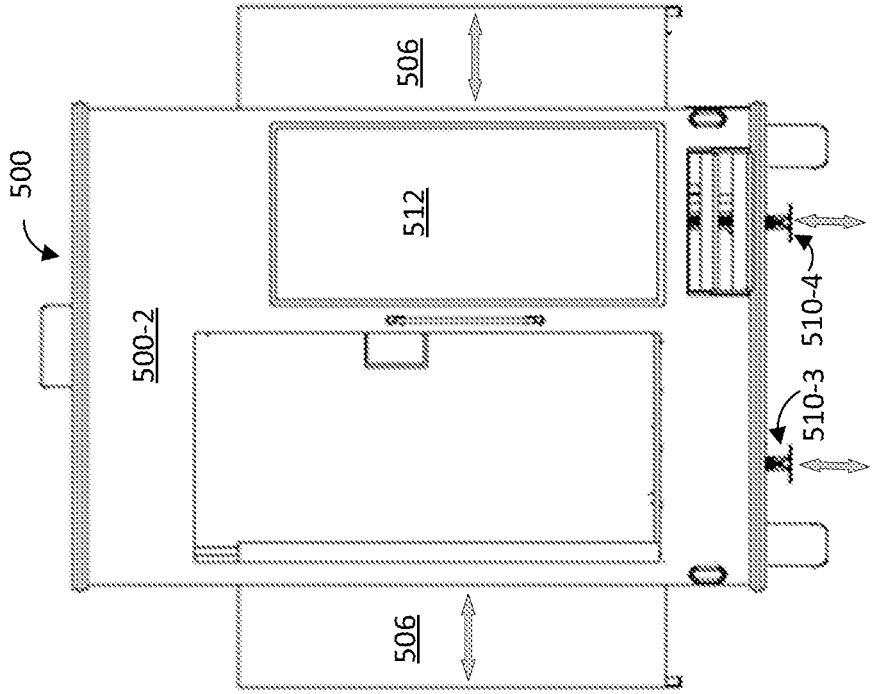
Figure 5C:
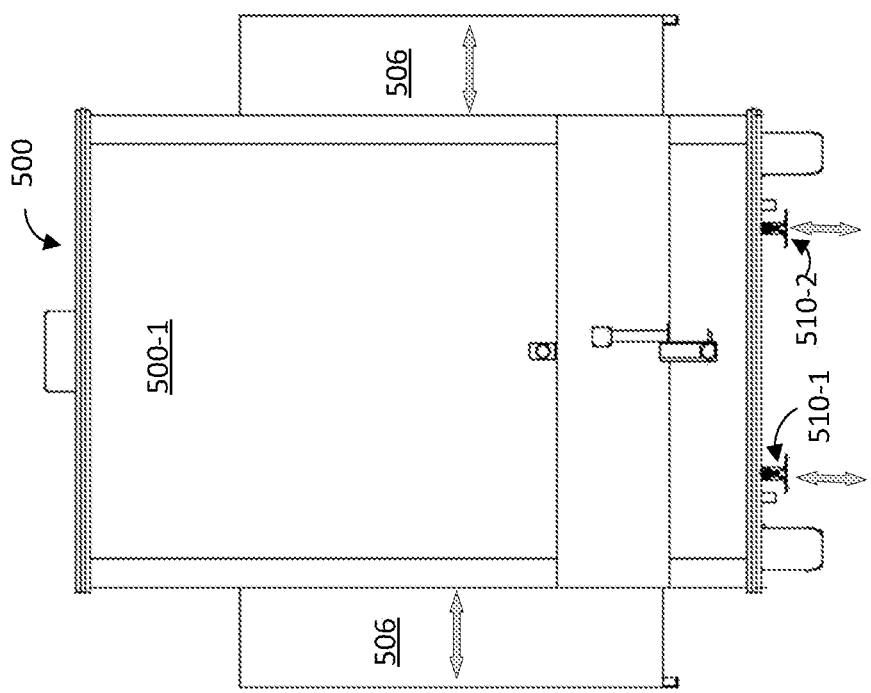

FIGS. 5C and 5D illustrate an example trailer 500 for user trailer configuration. The system 100 may adjust the tilt or height of the leveling jacks to provide an incline or decline of the trailer. The trailer 500 may dynamically adjust one or more leveling jacks 510-1, 510-2, 510-3, 510-4. Dynamic adjustment of the leveling jacks 510-1, 510-2, 510-3, 510-4 may result in modifying a tilt of the trailer 130. One or more of the leveling jacks 510-1, 510-2 may be oriented closer to a front end 130-1 of the trailer 130 than other leveling jacks 510-3, 510-4. One or more of the leveling jacks 510-3, 510-4 may be oriented closer to a back end 500-2 of the trailer 130 than other leveling jacks 510-1, 510-2. The back end 500-2 of the trailer 500 may include a door 512 for entrance into the trailer 500. Dynamic adjustment of the leveling jacks 510-1, 510-2, 510-3, 510-4 may also be based in part on a user profile, an activity profile and/or a current state of a user physically present at the trailer 500. According to various embodiments, a dynamic adjustment of an incline (or tilt) of the trailer 500 may be the result of running one or more motors associated with one or more leveling jacks 510-1, 510-2, 510-3, 510-4 for a period of time and/or at a certain speed that corresponds to one or more attributes as described herein. For example, if a user attribute represents a desired incline for a particular activity, one or more sensors and/or computer processing units of the trailer 500 may detect a current tilt of the trailer 500 and trigger the one or more motors to adjust an orientation of one or more of the leveling jacks 510-1, 510-2, 510-3, 510-4 until a sensor(s) of the trailer 500 detects a current tilt substantially equal to the desired incline attribute.

Figure 5E:
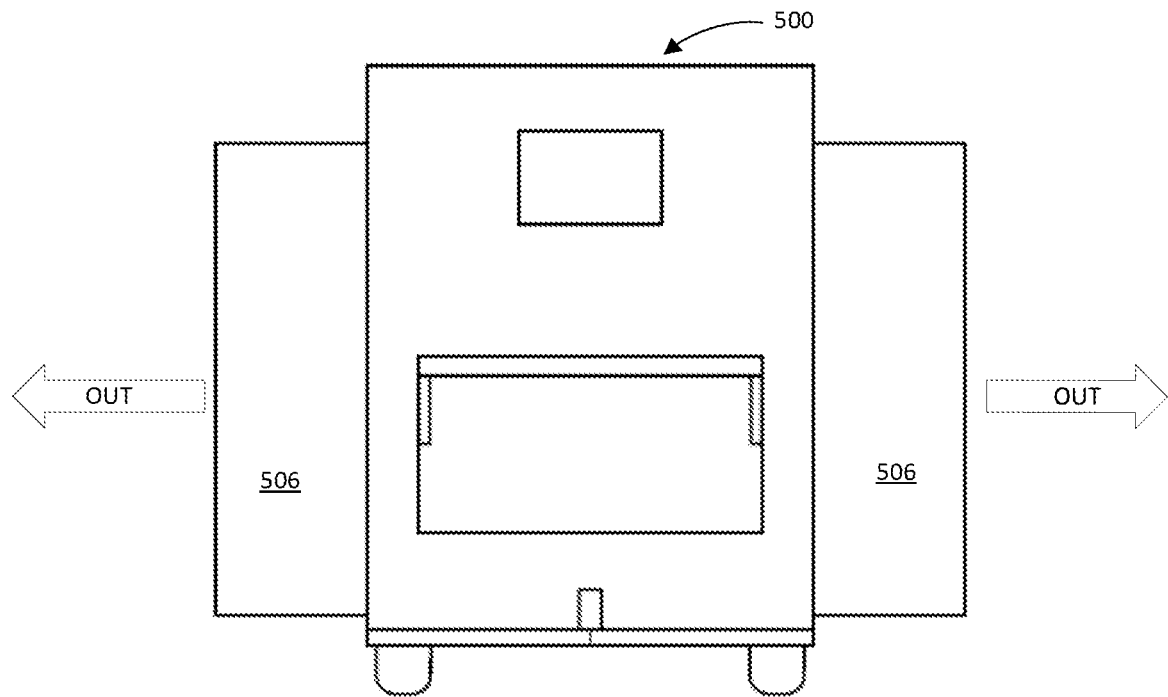
Figure 5F:
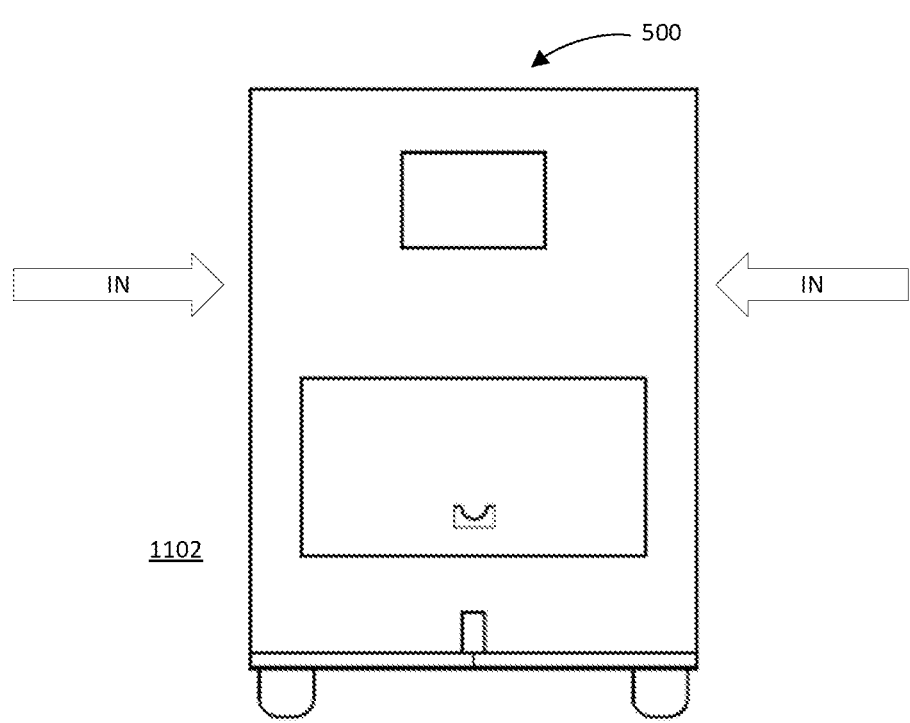

FIGS. 5E-5F illustrate respective configurations states of the trailer 500. FIG. 5E illustrates an example resting state in which one or more dynamic adjustments of the trailer result in at least a partial expansion of one or more portions of the trailer 500. According to various embodiments, the resting state may be associated with larger trailer dimensions than the dimensions associated with the transit state (e.g., FIG. 5F) with the slideouts shown in a retracted position. According to various embodiments, the resting state (with slideouts 506 shown in an extended position) may be a result of one or more dynamic adjustments of the trailer 500 to shut down (or turn off, power down, set to sleep mode) various portions or equipment (such as interior sensors) of the trailer 500. However, the resting state may leave the trailer 500 at a partially active state such that the trailer 500 can be readily modified according to one or more dynamic adjustments when a user triggers initiation of a reserved activity. The system 100 may determine inactivity by obtaining sensor data, such as video imagery, determine inactivity by using motion sensors and/or determine inactivity by using thermal sensors.

FIG. 5F illustrates an example transit state in which one or more dynamic adjustments of the trailer result in a trailer configuration to allow the trailer 500 (also referred to herein as 130) to be towed and/or transported. The system 100 may initiate a reconfiguration of the trailer into a transit state. For example, the transit state may include one or more dynamic adjustments that result in the positioning of one or more wheels 520. Other dynamic adjustments for the transit state may result in modifiable trailer dimensions due to moving one or more portions and/or surfaces of the trailer 500. It is understood that a vehicle may be temporarily attached to the trailer 500 and the vehicle my tow the trailer 500 to a location at which a user has requested (or is expecting) the trailer to be located for a reserved activity. The system 100 may schedule the trailer 500 to reconfigure to the transit state based on a predetermined date/time, or when the system 100 receives a command to reconfigure the trailer to the transit state. Moreover, the trailer may have a sensor to determine if the trailer has been attached to a tow vehicle. The system 100 may in response to determining the trailer has been attached to a tow vehicle, initiate reconfiguration of the trailer to the transit state.

The system 100 would determine that a person is not active or moving within the trailer. After a predetermined period of time, such as twenty minutes, the system 100 would initiate reconfiguration into the resting state. Additionally, the system 100 may schedule reconfiguration to the resting state at a pre-determined time period, such as 1:00 a.m., after confirming that there is no activity within the trailer. Moreover, the system 100 may perform a reconfiguration of the trailer into a resting state based on a received command from the system 100. Moreover, the trailer may have a sensor to determine if the trailer has been attached to a tow vehicle. The system 100 may in response to determining the detachment from a tow vehicle, initiate reconfiguration of the trailer from the transit state to the resting state. For example, the trailer 500 may be unhitched from the tow vehicle, the system 100 may determine then it is able to reconfigure the trailer to a resting state, and then reconfigure the trailer to the resting state.

Adjustable Trailer Components

A configurable trailer 130 may have panels, walls, floors, ceilings, screens, computers and other structures that are moveable and dynamically adjustable to different positions (collectively referred to as moveable components) via the trailer configuration module 104. Such structures may include equipment inside the trailer 130 or attached to an external surface of the trailer 130. Such structures may include, according to non-limiting examples, a camera(a), a light(s), a projector(s), sound recording equipment, medical diagnosis equipment and one or more pre-defined activity portions (such as a golf putting area, a basketball hoop, a baseball batting cage with a batting net and robotic pitcher, a desk, a chair, a microphone, and a scoreboard).

Computer Vision Sub-System

A configurable trailer 130 may include various sensors, such as camera, motion sensors, and lidar in the computer vision module 106. The sensors may be disposed internally about the interior of the configurable trailer 130 to capture information while a user moves about the interior of the trailer 130. For instance, digital cameras may obtain video of a user as they perform activities within the trailer 130. The captured video data and/or image data may be stored on a database or file system and may be associated with a user's identification information, such as a user profile. Additionally, the sensors may be disposed about the exterior of the trailer 130 to obtain information surrounding the exterior of the configurable trailer 130, such as detection of one or more objects external to the trailer 130. The system 100 may obtain the sensor data describing a person within the trailer, such as digital imagery of the person. The system 100 may evaluate the sensor data to determine physical characteristics of the person, such as a height value for the person. The system 100 may dynamically adjust at least one physical component of the trailer based on the determined height value of the person, such as a horizontal slideout or roof portion that is moveable in a vertical direction.

According to various embodiments, for example, if a user is performing a physical action for a selected activity, such as a practice golf swing for a selected golf activity, inside the trailer 130, the one or more sensors may detect the user's physical action in the trailer 130 and capture one or more images of the user. Such image capture may also occur prior to and/or after the physical action. The trailer 130 may have access to a database of previous video data and/or image data that correspond to the activity selected by the user. The previous video data and/or image data may be based in part on previous performances of the selected activity by other users. The trailer 130 may identify a type of physical action(s) represented in the previous video data and/or image data that correspond to the user's physical action in the trailer 130 in order to identify a label or category for the user's physical action. Such labels and categories may be pre-defined according to an activity profile of the selected activity. Upon assigning a label and/or category to the captured video and/or image data of the user's physical action, the trailer 130 may utilize the assigned label and/or category in determining whether to perform one or more dynamic adjustments via the trailer configuration module 104.

Trailer Leveling Sub-System

The configurable trailer 130 may include a leveling sub-system that adjusts the level or height of the configurable trailer 130. The leveling sub-system may be controlled by the system 100. Leveling jacks 510-1, 510-2, 510-3, 510-4 may be affixed to multiple locations of the underside of the trailer. The leveling jacks 510-1, 510-2, 510-3, 510-4 may be controlled by the system 100 where each of the jacks 510-1, 510-2, 510-3, 510-4 can be independently raised and/or lowered to move a portion of the trailer 130 upward or downward. The configurable trailer 130 may have sensors (such as an inclinometer, accelerometer and/or gyroscope) to determine the angle or tilt of the floor (or any other surface) of the configurable trailer 130.

As shown in FIGS. 5C and 5D, the trailer 130 may move the leveling jacks 510-1, 510-2, 510-3, 510-4 horizontally and/or vertically, and may do so such that positioning of the leveling jacks 510-1, 510-2, 510-3, 510-4 may be accomplished on an individual or concurrent basis per leveling jack. The trailer configuration module 104 may include a gradient detection module that may detect a gradient of a surface upon which the trailer 130 is placed. The trailer 130 may dynamically adjust one or more of the leveling jacks 510-1, 510-2, 510-3, 510-4 in order to realize a leveling of the of the trailer 130. In various embodiments, the dynamic adjustments of the leveling jacks 510-1, 510-2, 510-3, 510-4 may further be performed in real-time according to a user profile, an activity profile and/or current state of a user physically present at the trailer 130. For example, based on one or more capture images of the user via the computer vision module 105, the trailer 130 may determine that the user's orientation as portrayed in a captured image(s) is representative of a person being off balance. Based on such a determination, the trailer 130 may trigger the trailer configuration module 104 to dynamically adjust one or more of the leveling jacks 510-1, 510-2, 510-3, 510-4 in order to provide the internal portion of the trailer 130 with a compensating tilt in opposition to the direction(s) at which the user is moving towards in order to assist, in real-time, the user to avoid losing balance.

Configuration Presets

Figure 6:
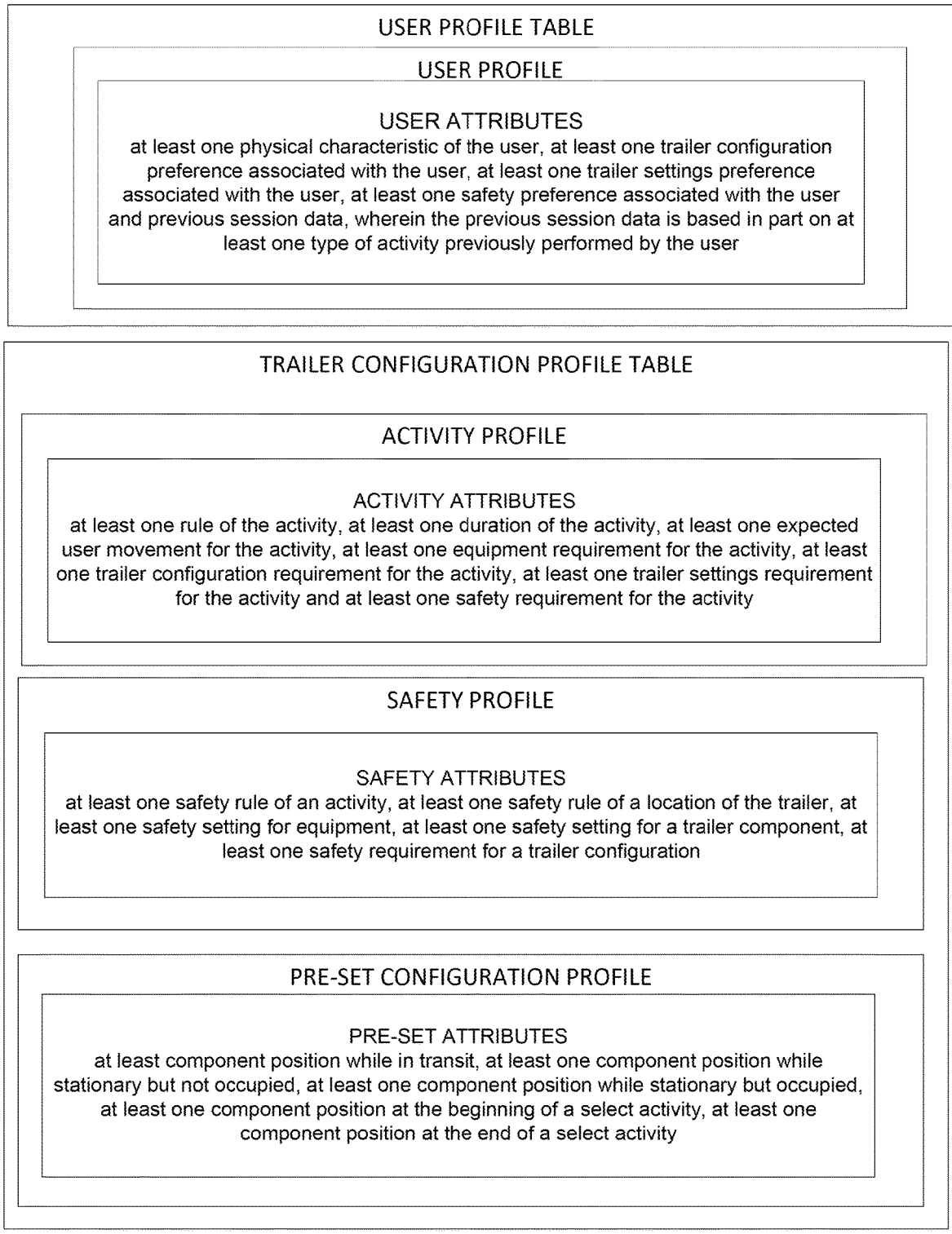
FIG. 6 is an example of a user profile table and a trailer configuration profile table in accordance with aspects of the present disclosure.

Configuration presets may be used to dynamic change the physical state of the configurable trailer 130 based in part on user profiles, activity profiles, safety profiles, pre-set trailer configuration profiles and/or physical actions performed at the trailer 130. FIG. 6 illustrates an example user profile table for user trailer configuration. The system 100 may use a user profile to store trailer configuration preferences and/or trailer configuration states. The system may include one or more activity profiles to store activity attributes for use in conjunction with the trailer configuration preferences and/or trailer configuration states to trigger dynamic adjustments of the one or more portions and components of the trailer 130. A trailer configuration preference may include trailer settings that a user may select. The trailer configuration preference informs the system 100 as to how the trailer may be configured. For example, the trailer configuration preference may include trailer settings such as light intensity and temperature. Other user profile attributes may be based on whether the user is right or left handed, one or more previous trailer configurations and a configuration mode specifying whether the user prefers to have approval over any automatic dynamic adjustments about to be performed by the trailer 130.

A user profile table may include one or more user profiles. Each user profile may include information about the user, such as name, User ID, at least one physical characteristics of the user (height, weight, strength), at least one trailer configuration preference associated with the user (preferred trailer dimensions, preferred trailer tilt, preferred placement of internal trailer components), at least one trailer settings preference associated with the user (lighting, sound, user interface organization), a safety preference associated with the user (deployment of one or more safety measures by the trailer for a selected activity) and previous session data, whereby the previous session data is based in part on at least one type of activity previously performed by the user. According to various embodiments, one or more dynamic adjustments may be based on one or more user attributes stored as user profile data 122. A non-limiting example of various user attributes includes: user height, user weight, user experience level, user handedness (right or left-handed), user activity equipment (such as type(s) of gold clubs), a slope (or incline) requested by the user, a lighting setting(s) requested by the user, a preferred language setting, a preferred music setting, a preferred temperature setting and a preferred virtual instructor voice setting. It is understood that a user may have different settings and/or preferred attributes for different types of activity. For example, the user may prefer one type of music genre for an activity and a different type of music genre for a different activity. The user may prefer a particular temperature for an activity and a different temperature for a different activity. Additional safety attributes and pre-set trailer configuration attributes may be part of the trailer configuration profile table as illustrated in FIG. 6.

The trailer 130 may allow for a plurality of different types of activities to be performed at the trailer 130. A trailer configuration table may include one or more activity profile. Each activity profile may correspond to a different type of activity and may have an activity profile associated with one or more activity attributes. Activity attributes may be based in part on, a rule(s) of the activity (such as game rules and/or required actions of an activity), a duration of the activity (such as maximum activity duration and/or activity intervals), an expected user movement for the activity (such as one or more possible types of user actions that could occur at a particular stage of the activity), at least one equipment requirement for the activity (such as required trailer equipment and/or equipment to be handled by the user during the activity), at least one trailer configuration requirement for the activity (such as one or more trailer components), at least one trailer settings requirement for the activity and at least one safety requirement for the activity. In some embodiments, an activity profile may have sub-profiles whereby each activity sub-profile includes values for the activity attributes associated with a particular user. The system 100 may use the activity or sub-activity profile to reconfigure the trailer for the particular activity or sub-activity to be performed.

Automated Trailer Configuration

Figure 7:
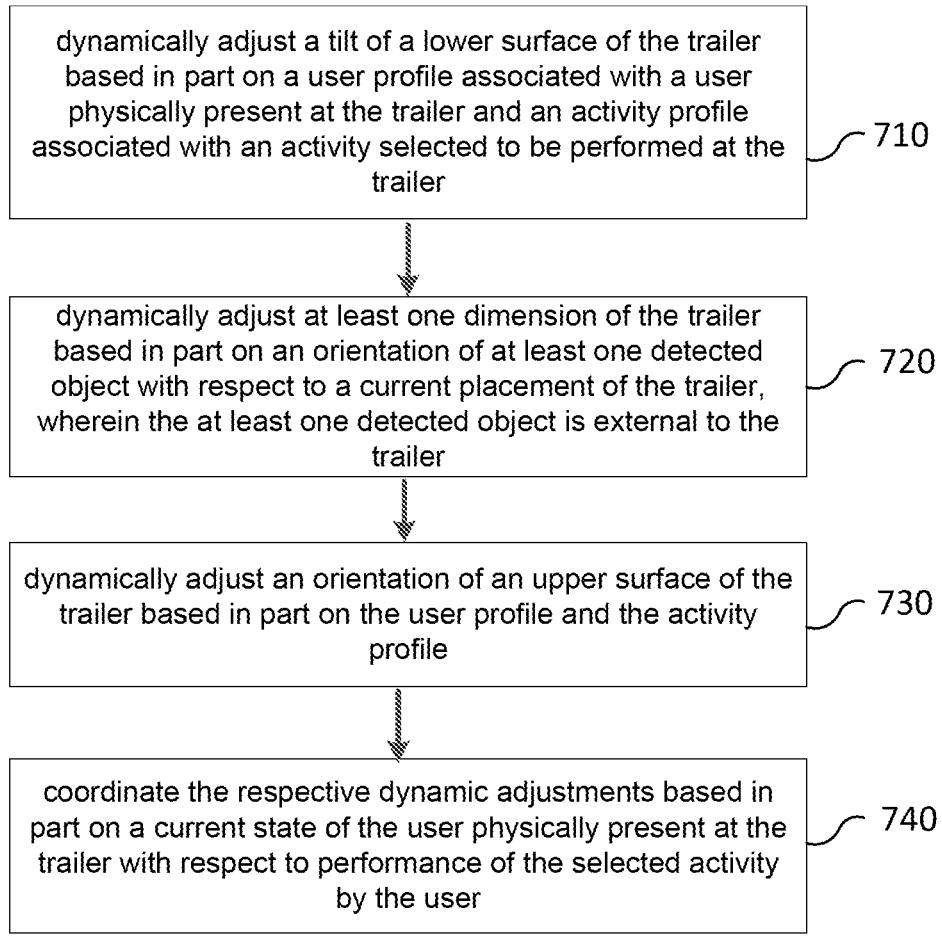
FIG. 7 is an example of an overview of a process for automatic trailer configuration based on a user profile in accordance with aspects of the present disclosure.

FIG. 7 illustrates an example method 700 for automatic trailer configuration based on a user profile. As discussed previously, a user may have a user profile that a particular configurable trailer 130 may use to dynamically change the physical state of the configurable trailer 130. An activity may have an activity profile that the particular configurable trailer 130 may use to dynamically change the physical state of the configurable trailer 130. The system 100, for example, may receive a user profile describing physical characteristics of a user, and/or describing an activity to be performed by the user. Based in part on the user profile, the system 100 may dynamically adjust at least one physical component of the trailer based on the user profile. The system may control the movement of physical component of the trailer, such as a slideout or leveling jack of the trailer.

The trailer 130 may dynamically adjust a tilt of a lower surface of the trailer 130 based in part on a user profile associated with a user physically present at the trailer and an activity profile associated with an activity selected to be performed at the trailer 130 (Act 710). For example, the trailer 130 may adjust a position of one or more of the leveling jacks 510-1, 510-2, 510-3, 510-4 to create a tilt orientation for the trailer 130 that is required for a selected activity according to the activity's profile. According to various embodiments, the trailer 130 may also dynamically adjust the tile of a floor or internal stage or platform within the trailer 130. Dynamic adjustment of the internal stage/platform may occur concurrently or separately from the adjustment of the tilt of the trailer 130. According to various embodiments, the user may initiate one or more dynamic adjustments of the trailer 130 from a mobile device or the dynamic adjustments may occur at a defined time that is adjacent to a reserved window of time during which the user has scheduled performance of a selected activity.

The trailer 130 may detect an object(s) external to the trailer 130. A computer vision module 106 may include one or more cameras on each of the slideout components for object detection. The detected object(s) may be a person, a vehicle, a building, and/or a fixture, for example. The trailer 130 dynamically adjusts a dimension(s) of the trailer based in part on an orientation of the detected external object with respect to a current placement of the trailer 130—as well as the user profile and the activity profile (Act 720). For example, the trailer 130 may extend a slideout component 506 for a distance that avoids contact with the external object. The trailer 130 may further detect that the external object is no longer proximate to the trailer 130 and the trailer 130 may then further adjust the slideout component 506 again to increase a distance at which the slideout component 506 is adjusted. In one example, the slideout component is a partially enclosed rectangular structure that when extended increases the space of the interior of the trailer. In one example, the slideouts have a floor, ceiling, a forward and aft wall connected to the floor and ceiling, and exterior wall connected to the floor, ceiling forward and aft walls. The trailer 130 includes motor or drive mechanism to extend or retract the slideouts 506.

The trailer 130 dynamically adjusts the orientation of an upper surface of the trailer 130 based in part on the user profile and the activity profile (Act 730). For example, the trailer 130 may adjust a positioning of a roof of the trailer 130 based on the physical actions of the user and/or when a selected activity is scheduled to begin.

The trailer 130 coordinates the respective dynamic adjustments based in part on a current state of the user physically present at the trailer 130 with respect to performance of the selected activity by the user. According to various embodiments, the trailer 130 may perform any of the adjustments described herein concurrently, individually and/or sequentially. That is, for example, two dynamic adjustments may occur concurrently followed by another group of concurrent adjustments. The dynamic adjustments may be applied to one or more external surfaces and/or external dimensions of the trailer 130 and/or one or more internal components and/or internal dimensions of the trailer 130. In some embodiments, the user may specify one or more dynamic adjustments by sending an adjustment request from a mobile device to a data processing system associated with the trailer. In some embodiments, the trailer 130 may include user-requested dynamic adjustments to be coordinated with one or more other dynamic adjustments.

Automated Scheduling of Trailer Configuration

Various embodiments allow for a user to schedule a start time for a selected activity via mobile device 140 in communication with the system 100. As shown in FIG. 2, the mobile device 140 includes an application engine 142 for communication with the system 100 via the API module 114 and displays a user interface 144 for sending requests to the system 100. A scheduled start time may be for a virtual coaching session or a virtual practice session for the selected activity. The start time may be a competitive session of the select activity against the performance of another user performing at another trailer (i.e. 130-1 or 130-2)—or who has previously performed at the same trailer 130 or other trailers (130-1 or 130-2). The user may schedule performance of the select activity according to one or more trailer configurations and/or one or more requested dynamic adjustments.

Predictive Trailer Configuration

Figure 8:
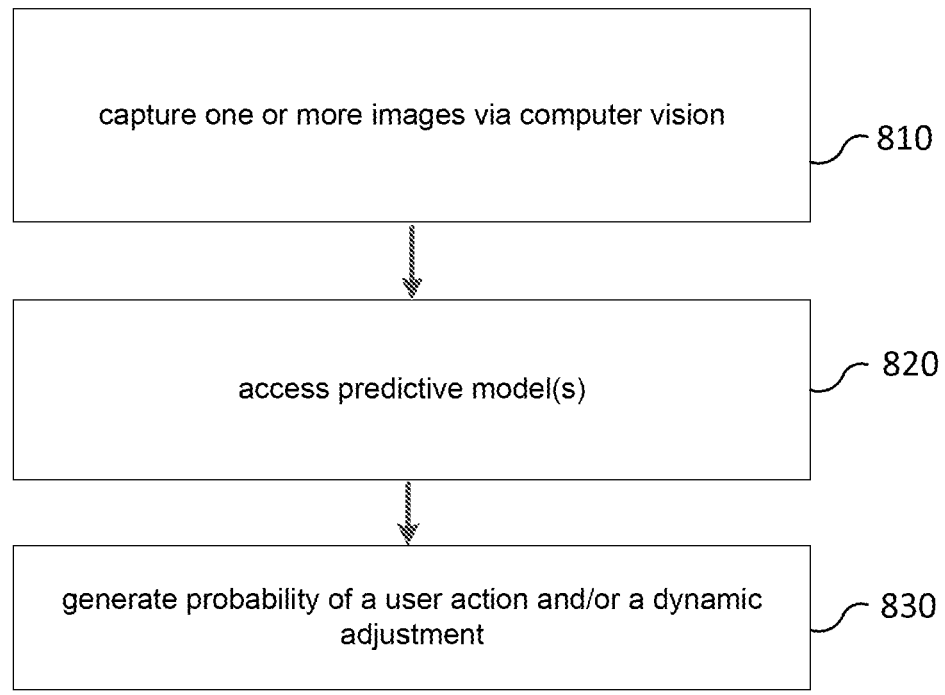
FIG. 8 is an example of an overview of a process for predicting a trailer configuration state in accordance with aspects of the present disclosure.

FIG. 8 illustrates an example method 800 for predictive trailer configuration state. The predictive module 112 may predict a moment at which the user may begin an upswing portion of a golf swing during a selected golf driving practice activity performed at a trailer configuration for a temporary golfing range. The user profile associated with the user may indicate the user's physical characteristics and the dimensions of the user's golf club. The trailer 130 may adjust a position of the slideout component 506 just before the predicted moment of the user's upswing and extend the slideout component 506 laterally in order to increase the internal dimensions inside the trailer 130 to accommodate for the user's upswing given the user's physical characteristics and the dimensions of the user's golf club. Dynamic adjustment of the upper surface 504 may be triggered in coordination with adjusting of the slideout component 506 for the predicted moment in order to realize an updated positioning of the upper surface 504 that also accommodates for the user's upswing.

The computer vision module 130 may capture one or more images of a user performing a physical action at the trailer 130 (Act 810). The predictive module 112 may access (or communicate with) a predictive model, such as one or more machine learning networks and/or models (Act 820). Such machine learning networks and models may be trained on training data based, in part, on user profiles associated with a plurality of users previously present at one or more trailers, whereby those plurality of users had engaged in performances of different types of activities at the one or more trailers. The training data may be further based, in part, on activity profiles associated with the respective different types of activities previously performed by the plurality of users and previous computer vision images captured during those previous performances.

The predictive module 112 may utilize input data based in part on a particular user profile associated with the user physically present at the trailer 130, the activity profile associated with the activity selected to be performed at the trailer 130, a captured computer vision image(s) of the user performing the selected activity and any dynamic adjustments already determined for the user physically present at the trailer. Machine learning techniques may be applied with respect to the input data and machine learning data based on the training data to generate one or more predictions as to a probability of an occurrence of an expected user action(s) and/or an expected dynamic adjustment(s) of the trailer 130 (Act 830). For example, upon predicting when the user may begin the upswing portion of the golf swing, the predictive module 112 may predict when the trailer 130 should initiate dynamic adjustment of the slideout component(s) 506 and the upper surface 504.

According to various embodiments, the predictive module 112 may identify one or more dynamic adjustments for a configuration of the trailer 130 that has resulted in improvement of the performance of various physical actions by other users during previous sessions of the same selected activity. For example, the predictive module 112 may identify a particular trailer configuration for a simulated golf range that has resulted in a detected increase in velocity of the other user's golf drives over a certain range of time, over a certain number of previous activity sessions and/or over a certain number of golf club swings. The trailer 130 may update the activity profile for golf range practice to include the particular trailer configuration as a pre-set configuration and/or as a secondary pre-set configuration to be suggested to a user for approval by the user. It is understood that the detected increase in velocity may be based on a virtual representation of a golf ball's behavior resulting from the angle, force and power detected by the trailer 130 of a user's physical golf swing using an actual golf club.

Trailer Dimensions and Interior Components

Figure 9A:
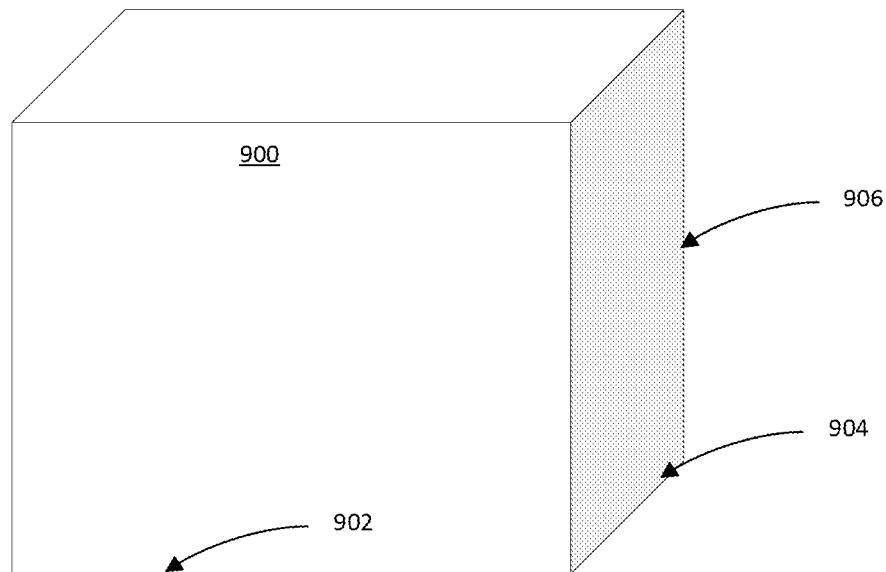
FIG. 9A is a diagram illustrating dimensionality of a practice space within configurable trailer.

FIG. 9A shows an exemplary dimensional size 900 of a practice area the trailer 130 associated with an activity, such as a type of golf practice session that required sensor equipment. As shown in FIG. 9A, one or more dimensions of the trailer 130 that will be the result of one or more dynamic adjustments of the trailer 130. In the example, the practice area is as least 14 ft wide 932, at least 10 ft deep 936, and at least 9 ft tall 534. For example, the dimensions of configurable trailer for a golf simulator may be 13-16 ft wide x 20 ft in length and just over 9.8 ft in height.

Figure 9B:
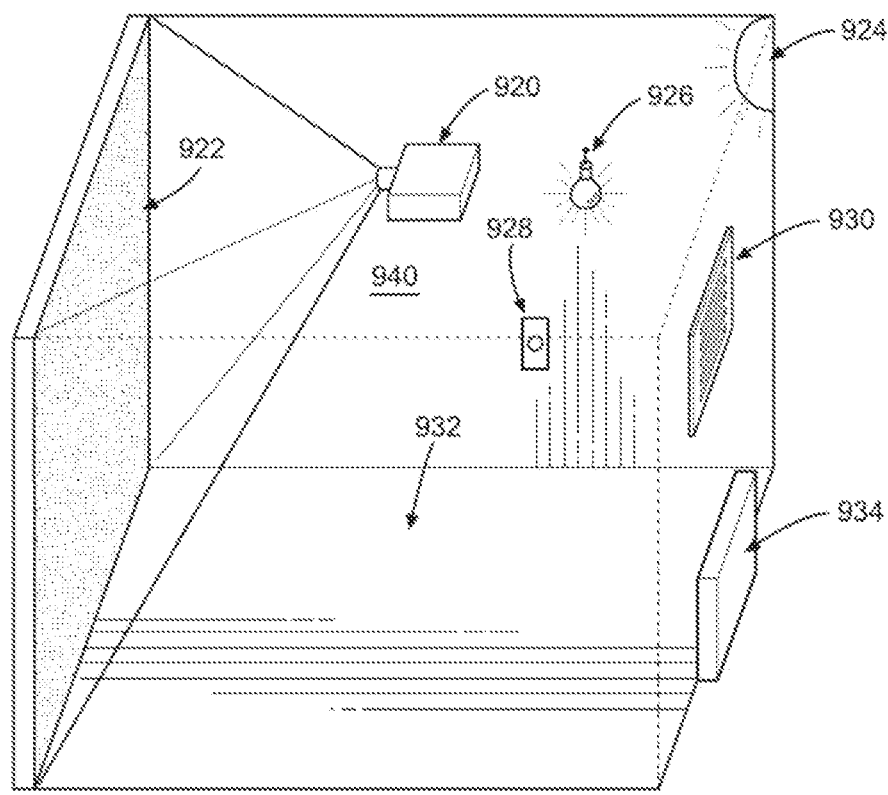
FIG. 9B is a diagram illustrating an exemplary environment of an interior of the configurable trailer.

FIG. 9B shows an example interior view 940 of an internal portion(s) of the trailer 130 that may include a video screen projector 920, a video screen 922 (e.g., used as an impact screen for hitting golf balls against), lighting equipment(s) 924, 926, a user control(s) 928 and turf 932. The trailer 130 may also include a window(s) 930 and a door 934. According to various embodiments, the video screen projector 920 may project digital imagery on the screen 922 associated with a virtual game based on a type of golf activity. As described herein, the positioning (or orientation) of the video screen projector 920, the video screen 922, the lighting equipment(s) 924, 926 and the user control(s) 928 may be individually, dynamically adjusted according to one or more user attributes, one or more activity attributes, one or more safety attributes and/or one or more pre-set attributes. For example, such dynamic adjustments may be based on one or more of a user's height and whether the user is right-handed or left-handed. It is understood that different respective attributes may be used for adjustment of each component 920, 922, 924, 926, 928. According to various embodiments, a dynamic adjustment of any component 920, 922, 924, 926, 928 may be the result of running one or more motors associated with one or more of the components 920, 922, 924, 926, 928 for a period of time and/or at a certain speed that corresponds to one or more attributes as described by FIG. 6. For example, if a user attribute represents that a user has a specific height, the trailer 130 may adjust a current position of the video screen projector 920 via the trailer configuration module 104 such that the distance between the turf 932 and the video screen projector 920 is greater than the user's height. One or more sensors and/or computer processing units of the trailer 130 may detect the current distance between the projector 920 and the turf 932 and trigger one or more motors to adjust a current orientation of the projector 920 until the sensors detect that the projector reaches an orientation that results in distance away from the turf 932 greater than the user's height.

The configurable trailer 130 may be configured for golf practicing and simulation. The configurable trailer is particularly suited and may be adapted for allowing a person to fully swing and practice with a variety of golf club, such woods, irons, wedges, putters, etc. While the present disclosure contemplates that the configurable trailer 130 may be configured automatically, the configurable trailer 130 may also be configured in a partially manually mode. For example, the slideouts, leveling jacks and other moveable components may be operated or adjusted via manual or computer operated controls to adjust the size and slope of the trailer.

A configurable trailer 130 utilized for golf simulation may have at least two wheels and may be towed by another vehicle. In a transit state (while being towed by another vehicle), the configurable trailer 130 has a length less than 40 feet long, 8 feet 6 inches wide, and 13 feet and 6 inches tall. In a use state, the configurable trailer 130 may be configured to create an open interior space of at least 11 feet wide, 15 feet long, and 9 feet tall from the interior floor to the interior ceiling of the trailer. In the use state, the configurable trailer 130 may be adjusted to alter a slope of the trailer from its natural resting slope by adjusting the leveling jacks. The slope of the trailer may be adjusted by moving the leveling jacks vertically. The system may, using a leveling sensor to measuring the angle of the trailer floor to a horizontal ground plane. The system may adjust the leveling jacks to set the trailer floor to a desire angle (or degree offset from the ground plane) to a desired inclination or declination.

In one embodiment, the interior of the trailer configured for the practice of golf. The configurable trailer 130 may have an impact screen for absorbing the force of a traveling ball. The impact screen may be affixed to a front interior end of the trailer. The impact screen for example, may be secured to the interior walls, floor and/or ceiling. The impact screen allows a person hitting balls while practicing in the configurable trailer 130. The trailer floor may include a putting green or area made of an artificial turf where a person may practice putting. The putting green may include one or more holes placed about the putting green.

The configurable trailer 130 may have a ball striking zone (e.g., a specified area set at a sufficient distance from the impact screen) where a person may practice hitting balls. The ball striking zone is an area suitable for allowing a person to fully take a golf swing. For example, the ball striking zone may be at least 9 square feet wide in area. One edge of the striking zone may be located at least 3 feet from one end of the trailer and the opposite end of the striking zone may be located at least 10 from the impact screen. The striking zone may be in the form of a raised surface from the trailer floor. For example, the striking zone may be an adjustable or non-adjustable practice be affixed to the floor of the configurable trailer 130. One or more sensors, such as a digital or video camera, may be positioned at least 3 feet from the center of the striking zone to capture the golf swing of a person practicing hitting balls. The sensors may be actuated automatically when motion is detected about the striking zone and capture image data while the person is practicing.

The configurable trailer 130 may include sensors to evaluate and capture the speed, and or trajectories of a ball hit from the striking zone into the impact screen. For example, the sensor may determine the speed of the ball hit, and the likely trajectory and angle of a golf ball hit from the striking zone. The ball movement data (e.g., speed, spin, angle, and other movement attributes) may be captured and stored by the computer system. The sensors may be placed internally about the configurable trailer. For example, a camera may be located at least 3 feet from the striking zone and be positioned at least 3 feet from other cameras. In one embodiment, three video camera are positioned around the striking zone in about at 120 degree increments. This allows the system to capture a 360 degree view of the person hitting a golf ball.

The configurable trailer 130 may include a projection system with a projector that projects imagery of different areas of a golf course onto the impact screen. For example, a tee box, fair way, putting green, water hazards, trees, sand traps, etc. may be displayed onto the impact screen. The system will graphically simulate a ball physically struck from the striking zone continuing into the imagery of the depicted golf course. The system uses the ball movement data to simulate the ball moving about the golf course. Additionally, information about the ball movement data may be displayed on the impact screen or via another user interface such a monitoring device. The system may use and consider simulated weather conditions when determining a simulated trajectory of the struck golf ball. In one embodiment, the projector produces at least 1000 lumens, and can display an image of at least 25 square feet on the impact screen. Moreover, the projector may also display at ball movement data on the impact screen.

The configurable trailer 130 may, via an onboard computer, upload captured practice data (such as the captured practice imagery) to a remote server system via an Internet connection. The onboard computer may store and display via a user interface (such as a monitor or the impact screen) imagery of the user. For example, the user may practice hitting multiple balls from the striking zone. In a review mode, the user may replay portions of the practice session and watch his or her golf club swinging form. The system may evaluate the golf club swing form and make recommendation for correction and/or adjustments to the golf form.

Other aspects of the configurable trailer 130 may include soundproofing material covering at least 3 interior sides of the trailer. For example, material that hat dampens the ball-to-screen impact noise of a ball traveling at 180 mph to less than 150 decibels on the inside and less than 120 decibels on the outside of the trailer. The configurable trailer 130 may have an air conditioner that can alter the temperature inside the trailer, and one or more light source inside the trailer that produce at least 400 lumens.

Collapsible Screen Attached to Slideout

Figure 10A:
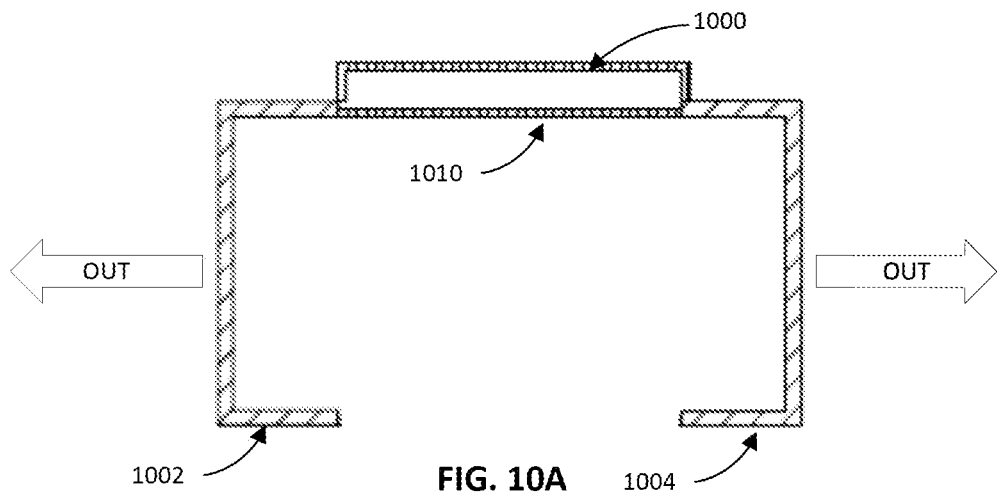
FIG. 10A is an example configuration of a portion of a trailer illustrating a double screen showing slideouts in an open position.

Referring to FIG. 10A, an example configuration of a portion of a trailer illustrating a double screen showing slideouts 1002, 1004 in open position. Screen 1010 is attached to the walls of the slideout. The screen may be made of a fabric, plastic or other materials, in a solid or mesh configuration that provides a barrier for an impact of a physical item thrown or hit into or against the screen. Another screen, Screen 1000 sits behind Screen 1010 and is attached to the body of the trailer. Screen 1000 is fixed to the front inside wall of the trailer. Screen 1010 has one end attached a portion of the right slideout, and has one end attached to a portion of the left slideout. When the slideouts are moved outwardly to an open position, the Screen 1010 is made taught in an operable position. The screen may then be used to project imagery onto the screen. The top of screen 1010 may be configured where the top of the screen 1010 does not touch the top of the ceiling of the trailer. This provides a gap between the top of screen 1010 and the ceiling of the trailer. An image then projected as to the gap would fall upon the back screen 1000. A person, for example, practicing golf within the trailer would observe a seamless image as to the front screen 1010 and the back screen 1000. Also, as balls are hit, especially chip shots, the balls may be hit high toward the top of the first Screen 1010. The balls may then go over the screen through the gap and into the space between the front screen 1010 and the back screen 1000. The balls then may land into a chamber or other type of ball retrieval system where the balls may be returned to the golfer via a channel or other ball retrieval mechanism built into the floor of the trailer.

Screen 1010 may be removeably attached to the slideouts with hooks, snaps, a hook and loop fastener (such as Velcro material), or other fastener mechanism. Screen 1010 while in the attached configuration allows for stretching of the Screen 1010 into an operable position. Using a non-permanent attachment mechanism, allows the Screen 1010 to be removed for cleaning or replacement.

Figure 10B:
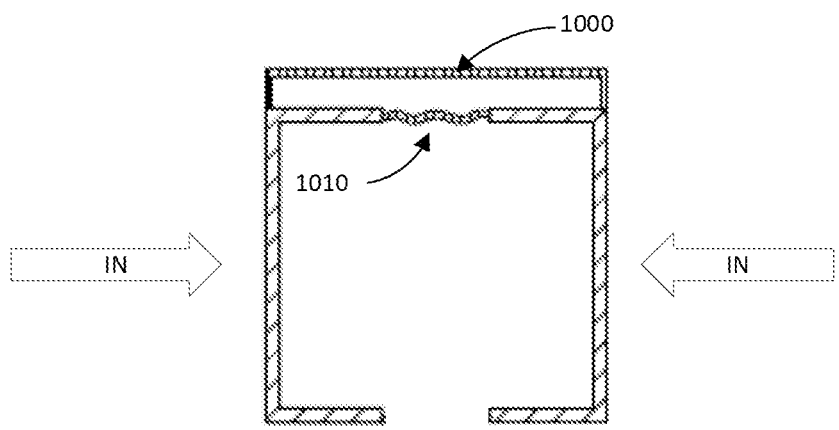
FIG. 10B is an example configuration of a portion of a trailer illustrating a double screen showing slideouts in a closed position.
Figure 11:
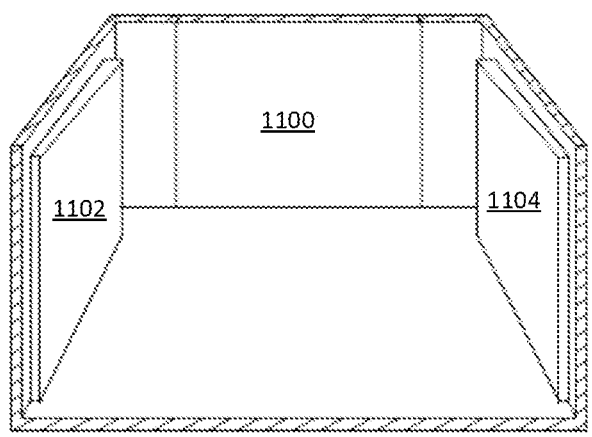
FIG. 11 is an example configuration of a portion of a trailer with slideouts having foam padding.

Referring to FIG. 10B, an example configuration of a portion of a trailer illustrating a double screen 1000, 1010 showing slideouts in a closed position. When the slideout is maneuvered into a closed position, screen 1010 is pushed in and collapsed. Having the screen sides affixed to the slideouts makes it easier to quickly set up the trailer in a usable configuration. The screen 1010 may be left affixed to the slideouts.

Foam Padding

Figure 12:
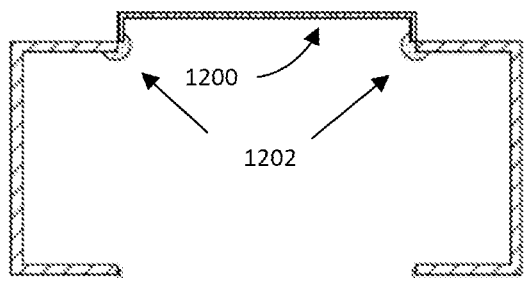
FIG. 12 is an example configuration with slideout configured with corner padding.

Referring to FIG. 12, an example configuration of a portion of a trailer with slideouts having foam padding 1202 shown. In the example shown, when slideouts are extended they may form a natural corner creating a potential hazard for an individual in the trailer. The corner may be padded with one inch or thicker foam through the whole length of the slideout.

In one configuration, the walls of the slideouts near the screen are reinforced with a foam pad. The foam pad for example, may have a foam thickness of at least one inch thickness. The foam pad may be angled slightly away from the center. The foam padding provides a surface that absorbs the impact of a physical item thrown or hit into the foam padding. The angling of the padding may also help guide a ball hit into the padding into a more central portion of the screen 1200.

Ceiling Nets

Figure 13A:
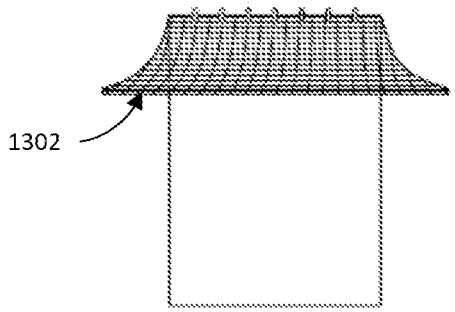
FIGS. 13A and 13B is an example configuration of a trailer with ceiling nets.
Figure 13B:
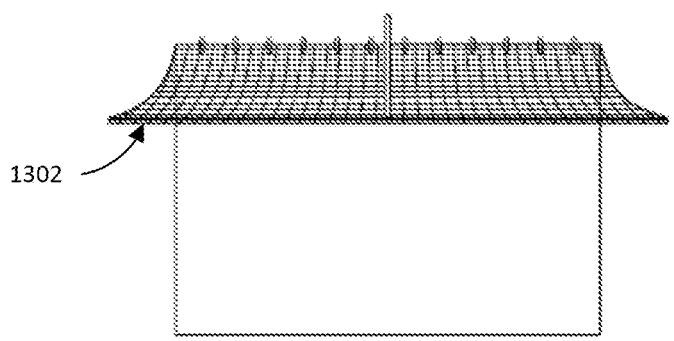

Referring to FIGS. 13A, 13B, a configuration with ceiling nets is shown. In one example, one ceiling net is attached to Screen 1000, and one ceiling net is attached to Screen 1010 (as described above). In one example, the ceiling nets 1302 cover at least 6 ft of the length of the ceiling in front of a position (where an actor such as a golfer stands), and is attached on one end of the ceiling and another end to screen 1010. The above configuration allows for the nets to automatically set when the trailer slideouts expand and automatically collapse when the slideouts are retrieved.

Example Trailer Embodiments

Figure 14A:
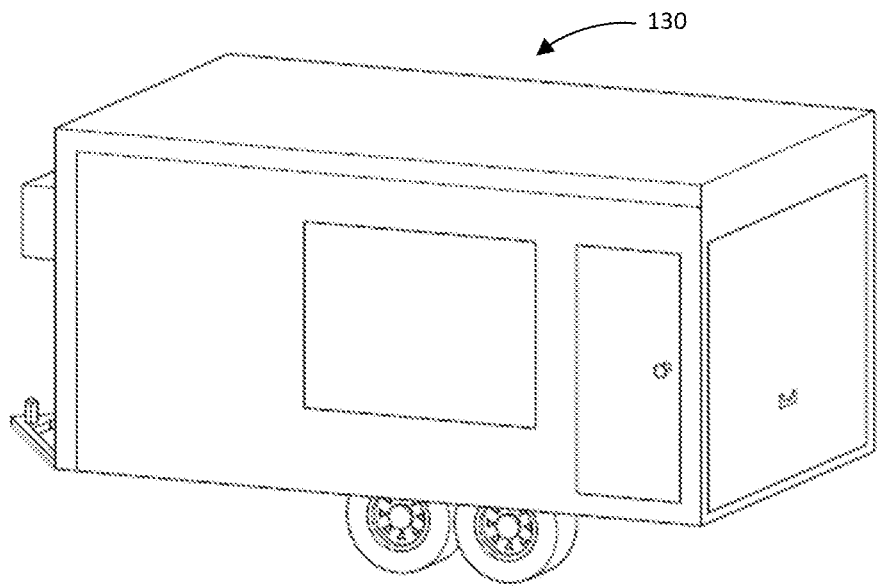
FIGS. 14A and 14B is an example embodiment of a configurable trailer.
Figure 14B:
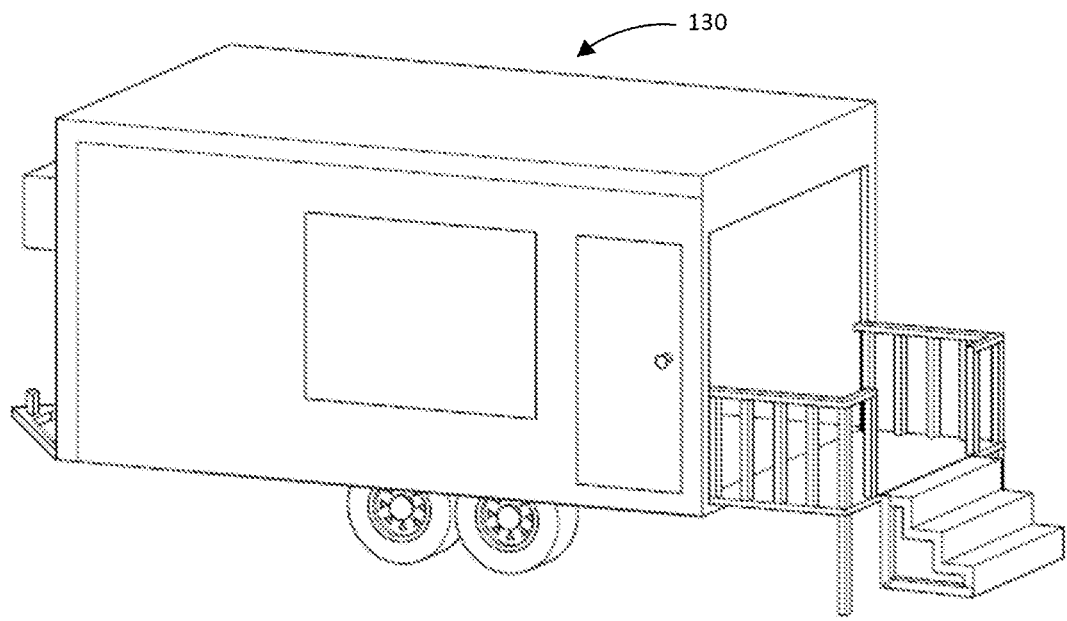

FIGS. 14A-14B is an example configuration of a trailer 130 with multiple slideouts. In the example trailer configuration, the trailer has a right and left slideout that moves outwardly from a retracted or stored position. The ramp of the trailer may be lowered planar to the ground to create a deck area to stand upon.

Figure 15A:
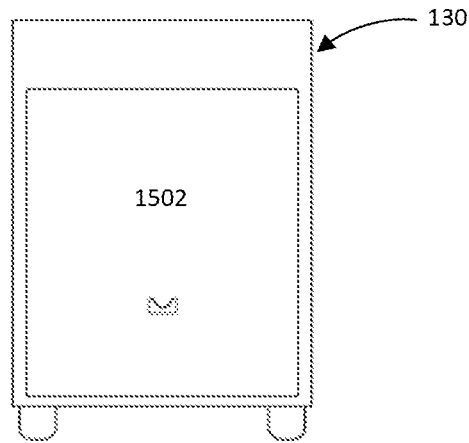
FIG. 15A-15D is an example embodiment of a configuration of a trailer.
Figure 15C:
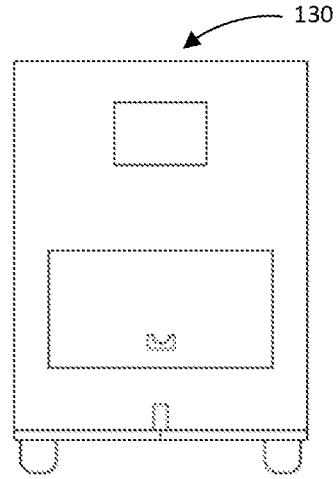
Figure 15B:
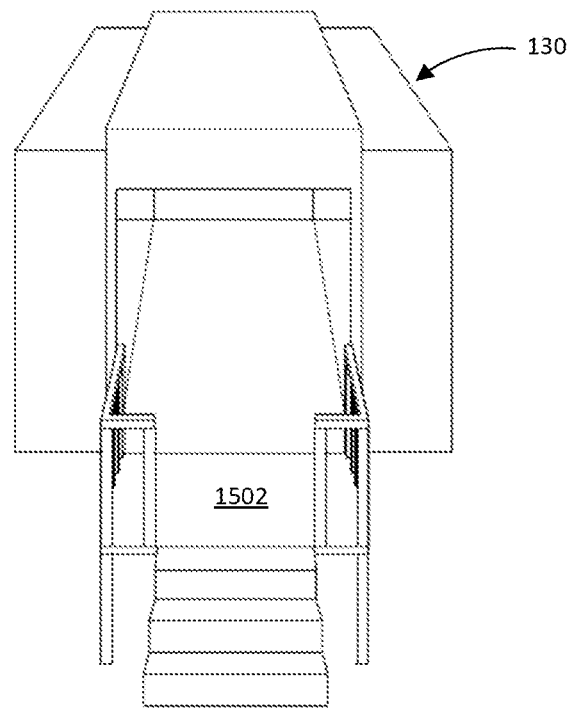
Figure 15D:
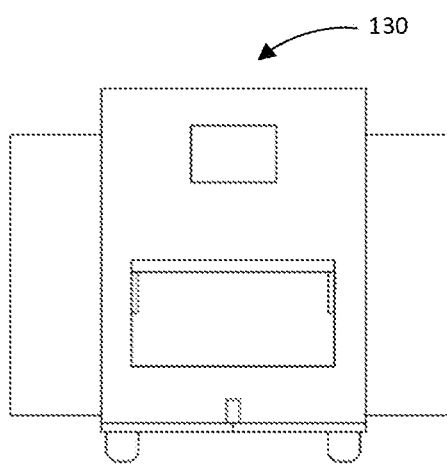

FIGS. 15A-15D is an example configuration of a trailer 130 with multiple slideouts. In the example trailer configuration, the trailer has a right and left slideout that moves outwardly from a retracted or stored position. The ramp of the trailer may be lowered planar to the ground to create a deck area to stand upon. FIG. 15A shows a rear view of the trailer with the ramp closed and in a stored position. FIG. 15B shows a rear view of the trailer with the slideouts open and with the ramp 1502 in a lowered configuration used as a deck, with hand rails and stairs that may be used to step up to the ramp. FIG. 15D show a front view of the trailer with the slideouts open.

Figure 16:
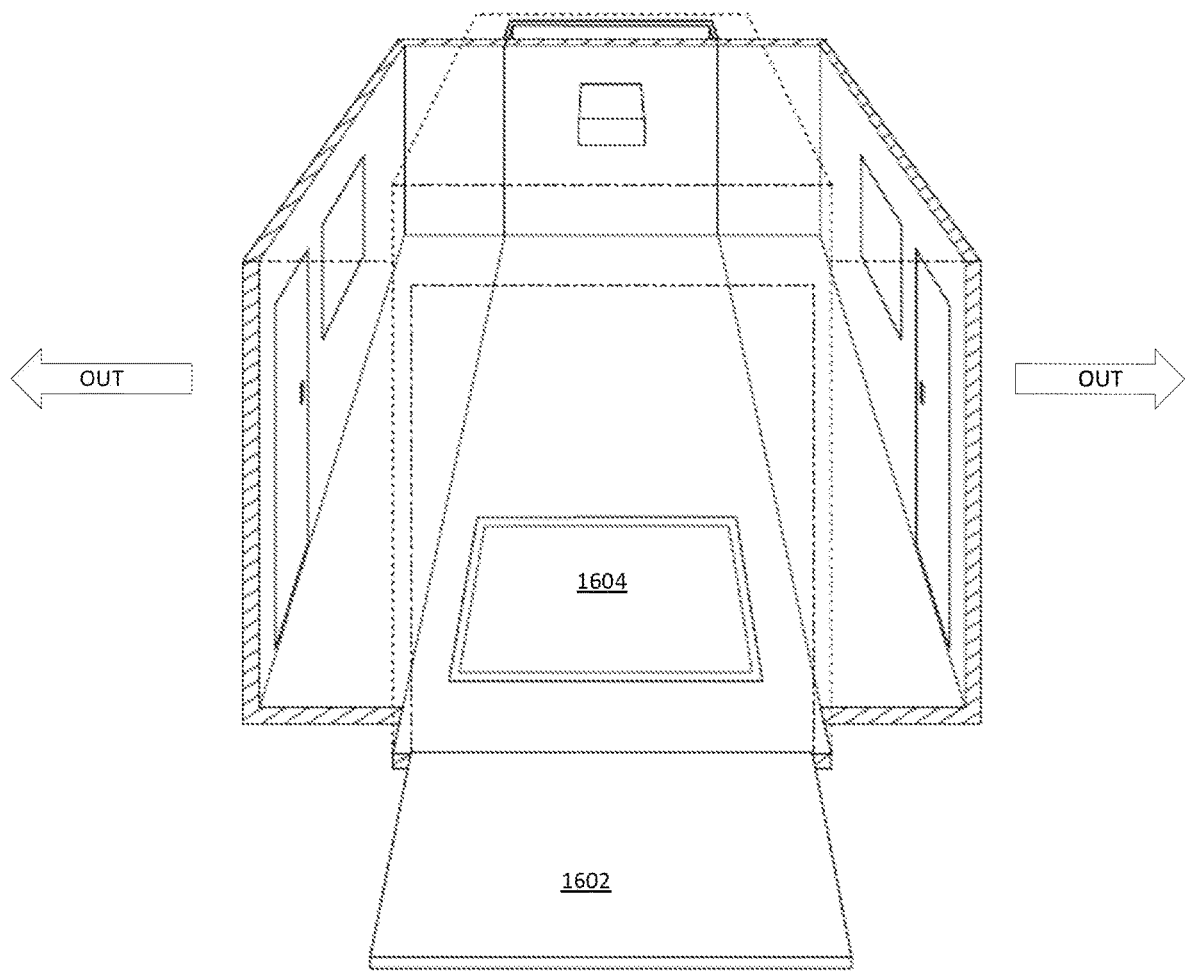
FIG. 16 is an example embodiment of a trailer.

FIG. 16 is an example configuration of a trailer 130 showing the ramp in a lowered position with the slideouts open. The slideouts may optionally have a door for accessing the trailer through the side. The trailer may have a practice mat affixed to the floor of the trailer. The mat 1604 may be used by an individual to practice hitting golf balls against a screen attached to the front interior side of the trailer.

Figure 17A:
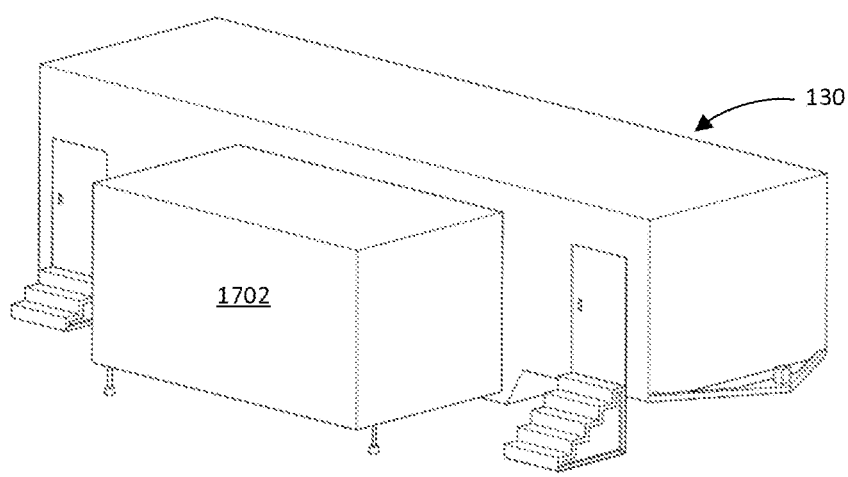
FIGS. 17A-17E is an example embodiment of a configurable trailer.
Figure 17B:
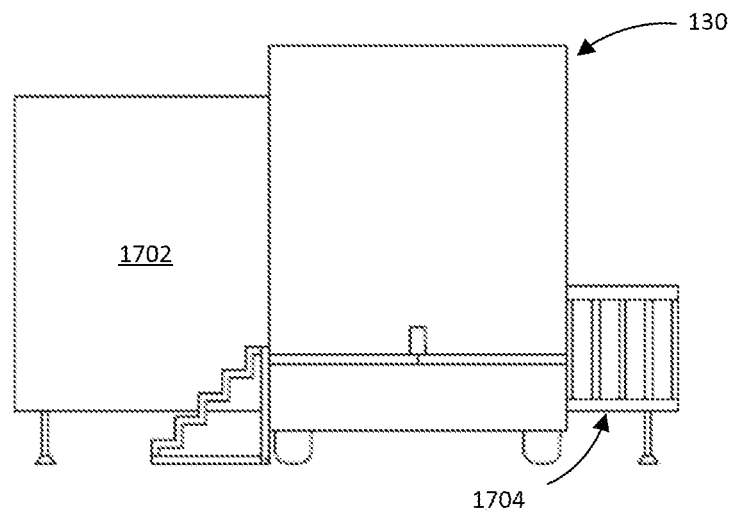
Figure 17C:
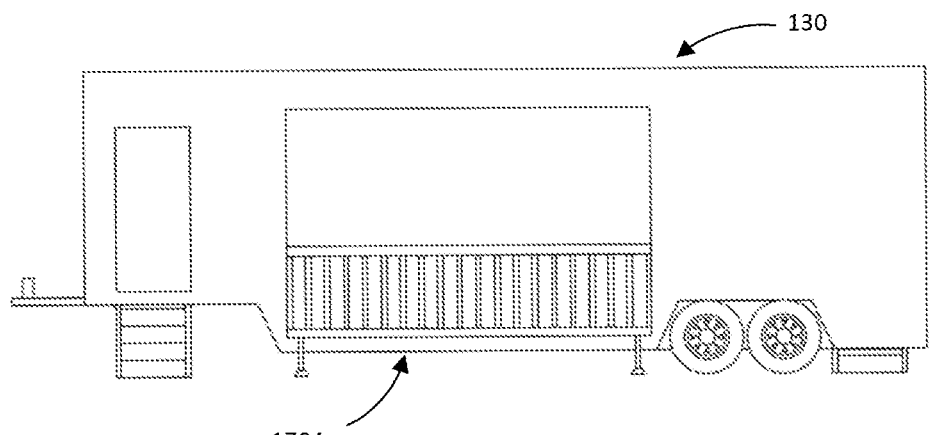
Figure 17D:
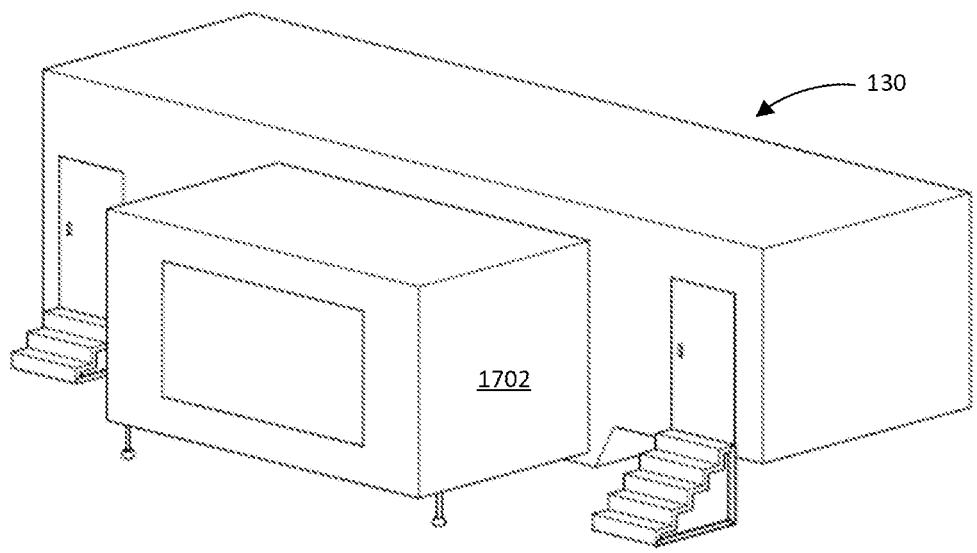

FIG. 17A-17D is an example configuration of a trailer 130 showing a trailer configuration where one side of the trailer has a slideout 1702, and the other side has a ramp 1704 that may be lowered into a planar position to form a deck area for people to move about. FIG. 17A show a front left perspective view of a trailer. FIG. 17B shows a front view of the trailer with the slideout 1702 extended, and the ramp 1704 in a lowered position. FIG. 17C shows a right sideview of the trailer with the ramp 1704 lowered, and a rail placed about the perimeter of the ramp 1704.

Figure 17E:
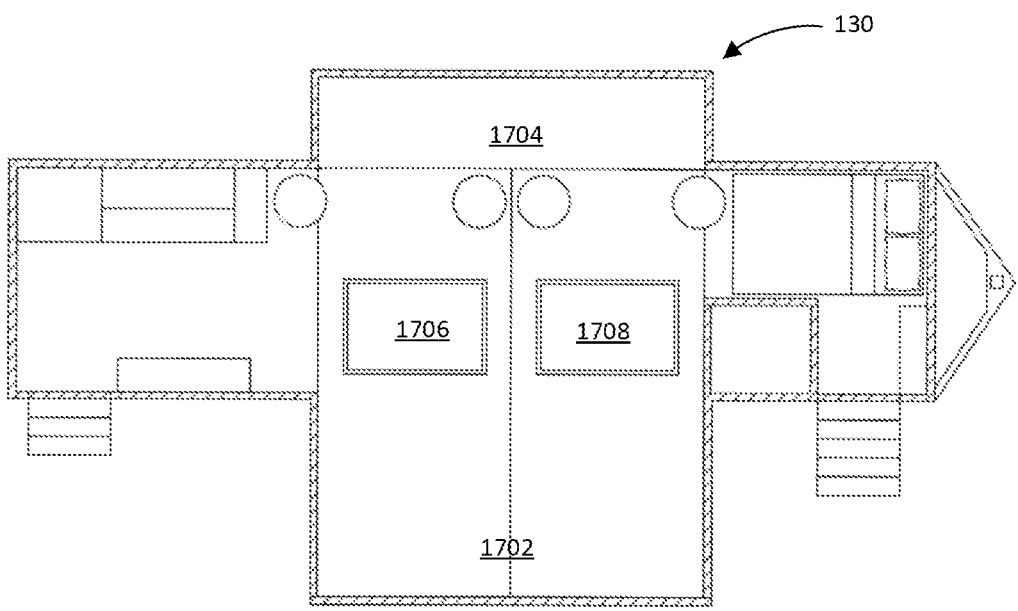

FIG. 17E is an example configuration of a trailer 130 from a top view showing an example configuration of the trailer with the slideout 1702 and the wall (e.g., ramp) 1704 portion lowered into position. In the example configuration, the slideout 1702 is portioned into two sections with a first golf mat 1706 and a second golf mat 1708. This allows two individuals to practice next to one another.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method of operating a configurable trailer, the method comprising:
   providing the configurable trailer, the configurable trailer comprising:
   an onboard computer system;
   one or more moveable walls;
   a door for entrance into the trailer; and
   an impact screen affixed to an interior portion of the configurable trailer;
   creating a reservation having a start time for use of the configurable trailer by a user; and
   triggering, by the user, an adjustment to the configurable trailer related to the reservation.

2. The method of claim 1, further comprising:
   receiving, via a user interface, a selection of one or more trailer configurations preferences; and
   applying the one or more trailer configuration preferences to the configurable trailer.

3. The method of claim 2, wherein the one or more trailer configuration preferences includes any one of a lighting option, a temperature option, a music option and a voice option for a virtual instructor.

4. The method of claim 2, wherein applying the one or more trailer configuration preferences dynamically adjusts at least one physical component of the configurable trailer.

5. The method of claim 1, further comprising:
dynamically adjusting the configurable trailer based on information associated with the reservation.

6. The method of claim 1, further comprising:
providing prior user session data to the onboard computer system.

7. The method of claim 1, further comprising:
obtaining, via the onboard computer system, one or more images of the user performing an activity in the user configurable trailer.

8. The method of claim 1, wherein the one or more moveable walls of the configurable trailer are positioned in an in-use state such that that an interior portion of the configurable trailer provides clearance for the user to swing a golf club.

9. The method of claim 1, further comprising:
determining that a person is not active or moving within the trailer; and
after a period of time, initiating reconfiguration of the trailer to an after-use state.

10. The method of claim 1, further comprising:
determining the user is proximate to the user configurable trailer; and
adjusting the user configurable trailer to an in-use state.

11. The method of claim 1, wherein the configurable trailer comprises a trailer body with the one or more moveable walls, wherein a moveable wall comprises a moveable slideout that may be positioned in a transit state where the slideout is set in a retracted closed position, and wherein the slideout may be positioned in an in-use state where the slideout is set in an extended position.

12. The method of claim 1, wherein the configurable trailer comprises a trailer body with a striking zone located on an interior floor of the trailer body upon which a person may strike golf balls with a golf club at the impact screen while the one or more moveable walls are in an extended position.

13. The method of claim 1, wherein the configurable trailer comprises a trailer body, wherein the impact screen is affixed to a front inside wall of the trailer body and the impact screen affixed to the one or more moveable walls.

14. The method of claim 13, wherein a projector is positioned in an interior, upper portion of the trailer body such that the projector projects imagery of at least 25 square feet on the impact screen.

15. A configurable trailer system comprising:
a configurable trailer comprising:
an onboard computer system;
one or more moveable walls;
a door for entrance into the trailer; and
an impact screen affixed to an interior portion of the configurable trailer; and
one or more processors configured to perform the operations of:
creating a reservation having a start time for use of the configurable trailer by a user; and
triggering, by the user, an adjustment to the configurable trailer related to the reservation.

16. The system of claim 15, wherein:
the one or more processors are further configured to receive, via a user interface, a selection of one or more trailer configurations preferences; and
the onboard computer system is configured to apply the one or more trailer configuration preferences to the configurable trailer.

17. The system of claim 16, wherein the one or more trailer configuration preferences includes any one of a lighting option, a temperature option, a music option and a voice option for a virtual instructor.

18. The system of claim 16, wherein applying the one or more trailer configuration preferences dynamically adjusts at least one physical component of the configurable trailer.

19. The system of claim 15, wherein the onboard computer system is configured to:
dynamically adjust the configurable trailer based on information associated with the reservation.

20. The system of claim 15, wherein the one or more processors are further configured to:
provide prior user session data to the onboard computer system.

21. The system of claim 15, wherein the onboard computer system is configured to obtain one or more images of the user performing an activity in the user configurable trailer.

22. The system of claim 15, wherein the one or more moveable walls of the configurable trailer are positioned in an in-use state such that that an interior portion of the configurable trailer provides clearance for the user to swing a golf club.

23. The system of claim 15, wherein the onboard computer system is configured to:
determine that a person is not active or moving within the trailer; and
after a period of time, initiate reconfiguration of the trailer to an after-use state.

24. The system of claim 15, wherein the onboard computer system is configured to:
determine the user is proximate to the user configurable trailer; and
adjust the user configurable trailer to an in-use state.

25. The system of claim 15, wherein the configurable trailer comprises a trailer body with the one or more moveable walls, wherein a moveable wall comprises a moveable slideout that may be positioned in a transit state where the slideout is set in a retracted closed position, and wherein the slideout may be positioned in an in-use state where the slideout is set in an extended position.

26. The system of claim 15, wherein the configurable trailer comprises a trailer body with a striking zone located on an interior floor of the trailer body upon which a person may strike golf balls with a golf club at the impact screen while the one or more moveable walls are in an extended position.

27. The system of claim 15, wherein the configurable trailer comprises a trailer body, wherein the impact screen is affixed to a front inside wall of the trailer body and the impact screen affixed to the one or more moveable walls.

28. The system of claim 27, wherein a projector is positioned in an interior, upper portion of the trailer body such that the projector projects imagery of at least 25 square feet on the impact screen.

* * * * *